(12) United States Patent
Zhu et al.

(10) Patent No.: US 12,356,300 B2
(45) Date of Patent: Jul. 8, 2025

(54) METHOD FOR VOICE CALLING, SYSTEM, CHIP, ELECTRONIC DEVICE, AND STORAGE MEDIUM

(71) Applicant: Shenzhen Goodix Technology Co., Ltd., Guangdong (CN)

(72) Inventors: Ming Zhu, Guangdong (CN); Long Xie, Guangdong (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 368 days.

(21) Appl. No.: 17/894,024

(22) Filed: Aug. 23, 2022

(65) Prior Publication Data
US 2023/0042997 A1    Feb. 9, 2023

Related U.S. Application Data

(63) Continuation of application No. PCT/CN2020/114003, filed on Sep. 8, 2020.

(51) Int. Cl.
*H04W 4/80* (2018.01)
*H04W 76/10* (2018.01)
*H04W 76/30* (2018.01)

(52) U.S. Cl.
CPC .......... *H04W 4/80* (2018.02); *H04W 76/10* (2018.02); *H04W 76/30* (2018.02)

(58) Field of Classification Search
CPC ........ H04W 4/80; H04W 76/10; H04W 76/30
See application file for complete search history.

(56) References Cited

U.S. PATENT DOCUMENTS

2014/0106675 A1    4/2014    Chou et al.

FOREIGN PATENT DOCUMENTS

| CN | 103716068 | * | 4/2014 | ............... H04B 5/00 |
| CN | 103716068 A | | 4/2014 | |
| CN | 104618571 A | | 5/2015 | |
| CN | 105472773 | * | 4/2016 | ............ H04W 76/02 |
| CN | 105472773 A | | 4/2016 | |

OTHER PUBLICATIONS

Shenzhen Goodix Technology Co., Ltd., International Search Report with English Translation, PCT/CN2020/114003, May 27, 2021, 6pgs.
Shenzhen Goodix Technology Co.,Ltd., CN First Office Action with English Translation, CN202010935271l, Nov. 2, 2020, 24pgs.

* cited by examiner

*Primary Examiner* — Tuan H Nguyen
(74) *Attorney, Agent, or Firm* — Finnegan, Henderson, Farabow, Garrett & Dunner, LLP

(57) ABSTRACT

Some embodiments of the present disclosure provide a voice call method, a system, a chip, an electronic device, and a storage medium. In the present disclosure, the voice call method includes: in response to receiving a voice call request instruction from a second terminal in a process of transmitting a voice call data packet with a first terminal, sending a request for disconnecting synchronous data connection to the first terminal (101); transmitting the voice call data packet to the second terminal (102) after receiving a request for establishing the synchronous data connection sent by the second terminal. In a scenario where there are incoming calls from multiple terminals, data communication load of a Bluetooth chip can be lessened, and power consumption of the Bluetooth chip can be reduced.

20 Claims, 8 Drawing Sheets

METHOD FOR VOICE CALLING, SYSTEM, CHIP, ELECTRONIC DEVICE, AND STORAGE MEDIUM

CROSS REFERENCE TO RELATED APPLICATIONS

The present application is a continuation of PCT Patent Application No. PCT/CN2020/114003, entitled "METHOD FOR VOICE CALLING, SYSTEM, CHIP, ELECTRONIC DEVICE, AND STORAGE MEDIUM", filed on Sep. 8, 2020, which is related to Chinese patent application No. 202010935271.1, entitled "METHOD FOR VOICE CALLING, SYSTEM, CHIP, ELECTRONIC DEVICE, AND STORAGE MEDIUM," filed on Sep. 8, 2020, each of which is incorporated by reference herein in its entirety.

TECHNICAL FIELD

The present disclosure relates to the technical field of communication, and in particular to, a voice call method, a system, a chip, an electronic device, and a storage medium.

BACKGROUND

With more and more extensive applications and more and more diversified application scenarios of a wireless Bluetooth headset, a user generally connects the headset to multiple terminal devices, for example, the user may have multiple mobile phones, in-vehicle Bluetooth devices, etc. At present, for the application scenario where the wireless Bluetooth headset is connected to multiple mobile phones, one of the multiple mobile phones establishes synchronous data connection during a call, while another mobile phone of the multiple mobile phones receives a call, usual practice of the wireless Bluetooth headset is to directly establish the synchronous data connection with the latter mobile phone. In this case, the wireless Bluetooth headset needs to establish two synchronous data connections to handle multiple calls.

The inventor found that there are at least the following problems in the prior art: in a scenario of having incoming calling from multiple terminals, the headset wireless Bluetooth headset needs to establish multiple synchronous data connections, which increases data communication load and power consumption of the wireless Bluetooth headset.

SUMMARY

Some embodiments of the present disclosure aim to provide a voice call method, a system, a chip, an electronic device, and a storage medium, so that data communication load of a Bluetooth chip can be reduced and power consumption of the Bluetooth chip can be decreased in a scenario having incoming calls from multiple terminals.

In some embodiments, a voice call method applied to a first chip is provided. The voice call method includes: in response to receiving a voice call request instruction from a second terminal in a process of transmitting a voice call data packet with a first terminal, sending a request for disconnecting a synchronous data connection to the first terminal; transmitting the voice call data packet to the second terminal after receiving a request for establishing the synchronous data connection sent by the second terminal.

In some embodiments, a voice call method applied to the first chip is further provided. The voice call method includes: stopping transmitting a voice call data packet to a third terminal after receiving a request for disconnecting a synchronous data connection sent by the third terminal in response to a first preset condition being met; where the first preset condition includes: receiving, by the third terminal, a voice call request instruction from a second terminal in a process that the third terminal transmits the voice call data packet with the first chip.

In some embodiments, a voice call method applied to a second chip is further provided. The voice call method includes: sending, by the second chip, a voice call request instruction to a third terminal in a process that the third terminal transmits a voice call data packet with a first terminal; where the third terminal sends a request for disconnecting a synchronous data connection to the first terminal after the voice call request instruction is received by the third terminal; sending, by the second chip, a request for establishing the synchronous data connection to the third terminal after the third terminal sends the request for disconnecting the synchronous data connection to the first terminal; transmitting the voice call data packet to the third terminal.

In some embodiments, a voice call system is further provided. The voice call system includes: a Bluetooth chip, a first terminal and a second terminal, where the Bluetooth chip is configured to, in a process of transmitting a voice call data packet with the first terminal, in response to receiving a voice call request instruction from the second terminal, send a request for disconnecting a synchronous data connection to the first terminal; the first terminal is configured to receive and respond to the request for disconnecting the synchronous data connection sent by the Bluetooth chip; the second terminal is configured to send the voice call request instruction to the Bluetooth chip after receiving an incoming call, and send a request for establishing the synchronous data connection to the Bluetooth chip after the request for disconnecting the synchronous data connection is sent by the Bluetooth chip to the first terminal; the Bluetooth chip is further configured to transmit the voice call data packet to the second terminal after the request for establishing the synchronous data connection sent by the second terminal is received.

In some embodiments, a Bluetooth chip is further provided. The Bluetooth chip includes at least one processor; and a memory communicatively connected to the at least one processor, where the memory stores an instruction executable by the at least one processor, and the instruction, when executed by the at least one processor, causes the at least one processor to perform the voice call method applied to the Bluetooth chip.

In some embodiments, a first chip is further provided. The first chip includes at least one processor; and a memory communicatively connected to the at least one processor, where the memory stores an instruction executable by the at least one processor, and the instruction, when executed by the at least one processor, causes the at least one processor to perform the voice call method applied to the first chip.

In some embodiments, a second chip is further provided. The second chip includes at least one processor; and a memory communicatively connected to the at least one processor, where the memory stores an instruction executable by the at least one processor, and the instruction, when executed by the at least one processor, causes the at least one processor to perform the voice call method applied to the second chip.

In some embodiments, an electronic device is further provided. The electronic device includes in response to the electronic device being a third terminal, the electronic device includes the Bluetooth chip; in response to the electronic device being a first terminal, the electronic device includes the first chip; in response to the electronic device being a second terminal, the electronic device includes the second chip.

In some embodiments, a computer-readable storage medium is further provided. The computer-readable storage medium stores a computer program that, when executed by a processor, causes the processor to perform the voice call method according to any one above.

Compared with the prior art, in the embodiments of the present disclosure, in a process of transmitting the voice call data packet with the first terminal, in response to receiving the voice call request instruction from the second terminal and receiving an instruction for indicating permission to access a voice call of the second terminal, a request for disconnecting the synchronous data connection is sent to the first terminal; the voice call packet is transmitted to the second terminal after a request for establishing the synchronous data connection sent by the second terminal is received. That is, in a process that the Bluetooth chip transmits the voice call data packet with the first terminal, that is, in a process that the user answers a call from the first terminal through the Bluetooth chip, if the second terminal calls, the second terminal sends the voice call request instruction to the Bluetooth chip. After the voice call request instruction is received, the Bluetooth chip sends the request for disconnecting the synchronous data connection to the first terminal, so as to disconnect the synchronous data connection established between the first terminal and the Bluetooth chip. Then, the voice call data packet is transmitted to the second terminal after the request for establishing the synchronous data connection sent by the second terminal is received. That is, after disconnecting the synchronous data connection established with the first terminal, the Bluetooth chip establishes the synchronous data connection with the second terminal based on the request for establishing the synchronous data connection sent by the second terminal, so that the user can answer the call of the second terminal through the Bluetooth chip. Therefore, in a scenario where the Bluetooth chip faces incoming calls from multiple terminals, there is no need to establish multiple synchronous data connections on a Bluetooth chip side, which reduces data communication load and power consumption of the Bluetooth chip. In addition, the disconnection of the synchronous data connection established between the first terminal and the Bluetooth chip only indicates that the voice call data packet is currently unable to be transmitted between the first terminal and the Bluetooth chip, that is, the user is currently unable to answer the voice call of the first terminal through the Bluetooth chip, which does not mean hanging up the call of the first terminal and will not affect normal conversation of the user to a certain extent.

Furthermore, in response to receiving the voice call request instruction from the second terminal, sending the request for disconnecting the synchronous data connection to the first terminal includes: in response to receiving the voice call request instruction from the second terminal and receiving an instruction for indicating permission to access a voice call of the second terminal, sending the request for disconnecting the synchronous data connection to the first terminal. That is, before sending the request for disconnecting the synchronous data connection to the first terminal, the instruction for indicating permission to access the voice call of the second terminal is also received, so that the synchronous data connection between the Bluetooth chip and the first terminal is disconnected after determining that the voice call of the second terminal is allowed to be accessed (e.g., the user wants to access the voice call of the second terminal through the Bluetooth chip), which is conducive to meeting actual needs and improve user experience of the user.

Furthermore, before sending the request for disconnecting the synchronous data connection to the first terminal, the method further includes: in response to receiving the request for establishing synchronous data connection sent by the second terminal, not responding the request for establishing the synchronous data connection sent by the second terminal within a preset time period, or sending a message refusing to establish the synchronous data connection to the second terminal. That is, before the synchronous data connection established between the first terminal and the Bluetooth chip is not disconnected, even if the Bluetooth chip receives a synchronous data connection establishment request from the second terminal, the synchronous data connection with the second terminal is not established, so as to ensure that the Bluetooth chip only establishes the synchronous data connection with one terminal, which is conducive to reducing power consumption of the Bluetooth chip. Moreover, the Bluetooth chip refuses to establish the synchronous data connection with the second terminal, which only indicates that the voice call data packet is currently unable to be transmitted between the second terminal and the Bluetooth chip, that is, the user is currently unable to answer the voice call of the second terminal through the Bluetooth chip. The normal answering of the second terminal is not affected, and the second terminal can ring normally.

Furthermore, before sending the request for disconnecting the synchronous data connection to the first terminal, the method further includes: sending a first instruction to the first terminal; where the first instruction is used to instruct the first terminal to switch a call state from an answering state to a holding state; receiving a first response message to the first instruction from the first terminal; where the first response message is used to indicate that the call state of the first terminal is currently the holding state, which facilitates the first terminal to switched the call state back to the answering state as needed, thereby improving call experience. The first instruction is sent to the first terminal to instruct the first terminal to switch the call state from the answering state to the holding state, which facilitates the first terminal to switch the call state from the answering state to the holding state under the instruction of the first instruction. The first response message from the first terminal that is used to indicate that the current call state of the first terminal is the holding state is received, so that the Bluetooth chip is clearly notified the current actual call state of the first terminal, and ensure that the first terminal successfully responds to the first instruction and ensure smooth completion of switching the call state.

Furthermore, after transmitting the voice call data packet to the second terminal, the method further includes: in response to receiving an instruction for indicating an end of a voice call of the second terminal, sending the request for disconnecting the synchronous data connection to the second terminal; after sending the request for disconnecting the synchronous data connection to the second terminal, in response to receiving a request for establishing the synchronous data connection sent by the first terminal, sending a second instruction to the first terminal; where the second instruction is used to instruct the first terminal to switch the call state from the holding state to the answering state; receiving a second response message to the second instruction from the first terminal; where the second response message is used to indicate that the call state of the first terminal is currently the answering state. That is, after the call of the second terminal ends, the Bluetooth chip disconnects the synchronous data connection with the second terminal, and re-establishes the synchronous data connection with the first terminal, that is, the Bluetooth chip currently only establishes the synchronous data connection with one terminal, and then the call state of the first terminal is switched to the answering state, which is conducive to reducing power consumption of the Bluetooth chip, and facilitates the user to continue to answer the call of the first terminal through the Bluetooth chip. That is, the call of the first terminal is restored through the Bluetooth chip, which is conducive to improving user experience.

Furthermore, the Bluetooth chip is built in a third terminal, and the third terminal is a wireless Bluetooth headset. That is, in a process that the user uses the wireless Bluetooth headset to answer the call from the first terminal, if there is an incoming voice call from the second terminal, the second terminal sends a voice call request instruction to the wireless Bluetooth headset. When the wireless Bluetooth headset receives the voice call request instruction, and receives the instruction for indicating permission to access the voice call of the second terminal, that is, it is determined that the user wants to answer the call from the second terminal, the wireless Bluetooth headset disconnects the synchronous data connection established with the first terminal, and establishes synchronous data connection with the second terminal to access the call of the second terminal. Therefore, in the scenario where the wireless Bluetooth headset faces incoming calls from multiple terminals, there is no need to establish multiple synchronous data connections on the wireless Bluetooth headset side, which reduces data communication load and reduces power consumption of the wireless Bluetooth headset. And the disconnection of the synchronous data connection established between the first terminal and the wireless Bluetooth headset does not mean hanging up the call of the first terminal, but only indicates that the voice call data packet is currently unable to be transmitted between the first terminal and the wireless Bluetooth headset, that is, the user is currently unable to answer the voice call of the first terminal through the wireless Bluetooth headset, which will not affect the normal call of the user to a certain extent.

Furthermore, the synchronous data connection is: an extended synchronous connection-oriented (eSCO) connection. Since one eSCO connection occupies one asynchronous connectionless link (ACL) alone. In the prior art, when the first terminal is engaged in a call, if the second terminal calls, the Bluetooth chip establishes the eSCO connection (i.e., eSCO link) with both the first terminal and the second terminal. That is, there are two eSCO connection occupying two ACL links. The address space in the Bluetooth chip is limited, however both the ACL link and the eSCO link occupy the limited address space in the Bluetooth chip. In the limited address space, if the eSCO link occupies many address spaces, the address space allowing the establishment of the ACL link is relatively reduced, that is, the number of ACL links that can be established is reduced. The ACL link is the basis for data communication between the terminal and the Bluetooth chip. Therefore, the number of terminals that the Bluetooth chip can be connected to is affected. Compared with the prior art, in the embodiments of the present disclosure, the eSCO link can be saved, that is, the occupied address space can be saved, and the saved address space can be used to establish more ACL links. That is, more terminals are allowed to establish the ACL link with the Bluetooth chip, so that the Bluetooth chip can perform data communication with more terminals based on the establishment of the ACL link. That is, the number of terminals that the Bluetooth chip connected to can also be increased to a certain extent.

BRIEF DESCRIPTION OF THE DRAWINGS

One or more embodiments are described as examples with reference to the corresponding figures in the accompanying drawings, and the examples do not constitute a limitation to the embodiments. Elements with the same reference numerals in the accompanying drawings represent similar elements. The figures in the accompanying drawings do not constitute a proportion limitation unless otherwise stated.

DETAILED DESCRIPTION

Figure 1:
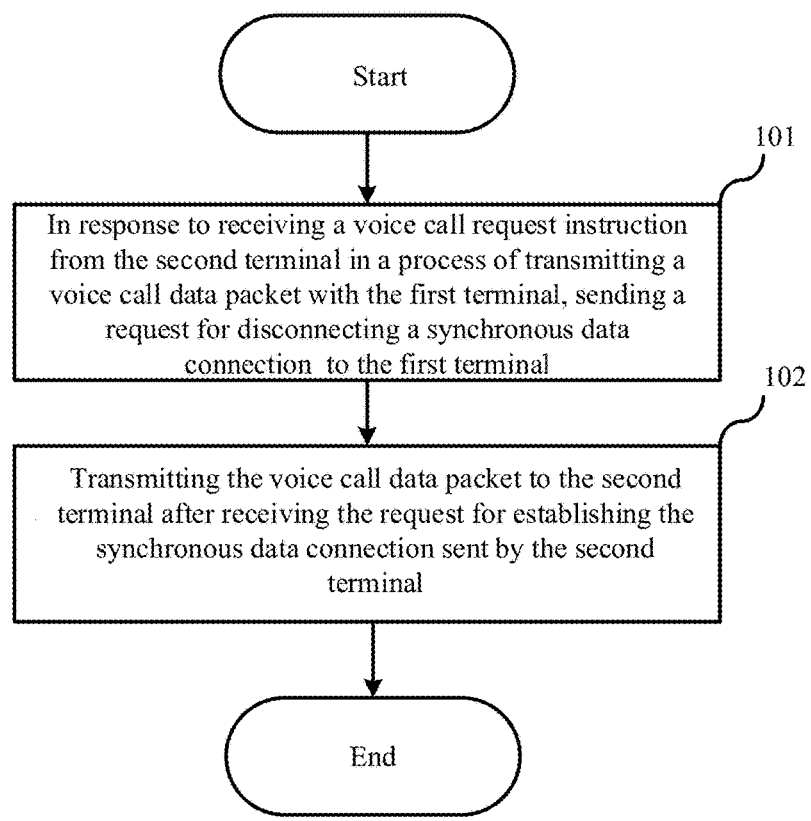
FIG. 1 is a flowchart of a voice call method according to a first embodiment of the present disclosure.

In order to describe objectives, technical solutions, and advantages of the present disclosure clearer, some embodiments of the present disclosure will be described in detail below with reference to accompanying drawings and embodiments. Those of ordinary skill in the art could understand that many technical details are provided in various embodiments of the present disclosure for the reader to better understand the present disclosure. However, even without these technical details and various changes and modifications based on the following embodiments, the technical solution claimed in the present disclosure can also be realized. The following embodiments are divided for ease of description and shall not constitute any restriction on the specific implementation method of the present disclosure. Various embodiments may be combined and referenced with each other on the premise of no contradiction.

The inventor of the present disclosure finds that the reason that causes data communication load and power consumption of a Bluetooth earphone to increase in the prior art lies in that: it is necessary to establish a number of synchronous data connections when receiving incoming calls from the number of mobile phones, which increases the number of synchronous data connections to be established, resulting in increased data communication load of the Bluetooth headset, and an increase of the number of established synchronous data connections increases power consumption of the Bluetooth headset. In order to solve the above technical problem, a voice call method is provided according to some embodiments of the present disclosure.

A first embodiment of the present disclosure relates to a voice call method applied to a Bluetooth chip, and the Bluetooth chip is built in a third terminal. For ease of description, the third terminal may also be called a wireless Bluetooth device in this embodiment and the following embodiments. The wireless Bluetooth device may be a wireless Bluetooth headset, an in-vehicle Bluetooth device, a Bluetooth watch, and the like. An application scenario of this embodiment is: a user has multiple terminals (e.g., a first terminal and a second terminal) that are paired and connected to the wireless Bluetooth device, and the first terminal and the second terminal may be a Bluetooth device (e.g., a mobile phone, a tablet computer, etc.) that can make calls. When the user uses the wireless Bluetooth device to answer a call of the first terminal, the wireless Bluetooth device receives a call access instruction of the second terminal, and the call access instruction may also be referred to as a voice call request instruction. For example, the wireless Bluetooth headset is taken as an example of the wireless Bluetooth device, and the mobile phone A and the mobile phone B are respectively taken as examples of the first terminal and the second terminal. The application scenario of this embodiment can be understood as: the user uses the wireless Bluetooth headset to answer a call of the mobile phone A while receiving a voice call from the mobile phone B. In this embodiment, a processing method of the Bluetooth chip in the above application scenario is mainly introduced. The implementation details of the voice call method of this embodiment will be specifically described below, and the following contents are only provided for ease of understanding, and are not necessary for implementing this solution.

For ease of understanding, a Bluetooth protocol involved in this embodiment is briefly described firstly.

The Bluetooth protocol stipulates that when call data transmission is carried out between the wireless Bluetooth device and a terminal, that is, when the wireless Bluetooth device is used to answer a call of the terminal, the following connection needs to be established between the wireless Bluetooth device and the terminal: ACL connection, hands-free profile, HFP, connection, and a synchronous data connection.

Herein, the ACL connection is a basic connection for data communication between the wireless Bluetooth device and the terminal, and supports both a symmetrical connection and an asymmetrical connection. The HFP connection is established based on the ACL connection. The HFP connection is used to realize feature interaction, status transmission, and coding mode negotiation supported between the wireless Bluetooth device and the terminal. After the HFP connection is established, the wireless Bluetooth device can control the mobile phone to perform, such as answering, hanging up, rejecting, voice dialing, etc., which is a settable mode for making the wireless Bluetooth device enter high-fidelity calls. In a specific implementation, after the wireless Bluetooth device and the terminal are paired and connected, establishment of the ACL connection and the HFP connection between the wireless Bluetooth device and the terminal is completed. The establishment of the ACL connection and the HFP connection between the wireless Bluetooth device and the terminal is a basis for using the wireless Bluetooth device to answer the call of the terminal.

The above synchronous data connection may also be referred to as voice data connection, and the synchronous data connection is a connection established between the wireless Bluetooth device and the terminal in a process of making a call or answering a call, for synchronizing call voice data of the terminal between the wireless Bluetooth device and the terminal. Herein, the synchronous data connection may be a SCO connection, or may be an eSCO connection. The eSCO connection is a more advanced voice data connection than the SCO connection, and the eSCO connection supports retransmission.

In a specific implementation, the basis for establishing the eSCO connection or the SCO connection between the Bluetooth chip in the wireless Bluetooth device and the terminal is as follows: if it is determined that both the wireless Bluetooth device and the terminal support the eSCO connection and the SCO connection according to characteristics of the wireless Bluetooth device and the terminal, the more advanced eSCO connection is established preferentially between the Bluetooth chip in the wireless Bluetooth device and the terminal. If it is determined that there is a party that does not support the eSCO connection in the wireless Bluetooth device and the terminal according to the characteristics of the wireless Bluetooth device and the terminal, the SCO connection is established between the Bluetooth chip in the wireless Bluetooth device and the terminal. It may be understood that after the HFP connection is established, the Bluetooth chip in the wireless Bluetooth device and the terminal can obtain the characteristics of each other, so as to determine whether the eSCO connection or the SCO connection can be established between the wireless Bluetooth device and the terminal.

As shown in FIG. 1, the voice call method in this embodiment specifically includes the following operations.

In operation 101, in response to receiving a voice call request instruction from the second terminal in a process of transmitting a voice call data packet with the first terminal, a request for disconnecting a synchronous data connection is sent to the first terminal.

Herein, the voice call request instruction is an instruction sent by the second terminal to the Bluetooth chip in the wireless Bluetooth device after an incoming call is received.

It may be understood that in a process that the Bluetooth chip transmits the voice call data packet with the first terminal, the Bluetooth chip accesses a call of the first terminal, indicating that the ACL connection, the HFP connection and the synchronous data connection are established between the Bluetooth chip and the first terminal. The Bluetooth chip receives a call access instruction of the second terminal, indicating that the ACL connection and the HFP connection are established between the Bluetooth chip and the second terminal, but the synchronous data connection is not established. That is, both the first terminal and the second terminal perform a Bluetooth pairing connection with the Bluetooth chip, and the first terminal and the second terminal respectively establish the ACL connection and the HFP connection with the Bluetooth chip. Currently, the Bluetooth chip accesses the call of the first terminal, indicating that the Bluetooth chip and the first terminal establish the synchronous data connection, and the Bluetooth chip and the first terminal synchronize the voice call data packet during a voice call.

In a specific implementation, after the incoming call is received, the second terminal send a call access instruction (i.e., the voice call request instruction) to the Bluetooth chip, and the call access instruction is used to notify the Bluetooth chip of the incoming call from the second terminal, so that the Bluetooth chip can know a current call state of the second terminal.

In an example, the call access instruction sent by the second terminal to the Bluetooth chip is a +CIEV (callsetup=1) instruction. Herein, a call indicator events reporting, +CIEV, instruction, callsetup=1 is status information carried by the +CIEV instruction, and callsetup=1 indicates that the current state of the second terminal is that there is an incoming call to be answered. After receiving the +CIEV (callsetup=1) instruction sent by the second terminal, the Bluetooth chip can be notified that the call state of the second terminal is currently that there is an incoming call coming to be answered.

In an example, in response to receiving the voice call request instruction from the second terminal, the Bluetooth chip sends the request for disconnecting the synchronous data connection to the first terminal. That is, if the Bluetooth chip receives the voice call request instruction from the second terminal, the Bluetooth chip can disconnect the synchronous data connection with the second terminal.

In another example, in response to receiving the voice call request instruction from the second terminal and receiving an instruction for indicating permission to access the voice call of the second terminal, the Bluetooth chip sends a request for disconnecting the synchronous data connection the first terminal. That is, if the Bluetooth chip receives the voice call request instruction from the second terminal and receives the instruction for indicating permission to access the voice call of the second terminal, the Bluetooth chip disconnects the synchronous data connection with the second terminal. In this way, the synchronous data connection between the Bluetooth chip and the first terminal is disconnected after determining that the voice call of the second terminal is allowed to be accessed (e.g., the user wants to access the voice call of the second terminal through the Bluetooth chip), which is conducive to meeting actual needs of the user and improve user experience.

An implementation of the Bluetooth chip receiving the instruction (hereinafter referred to as an instruction 1) for indicating permission to access the voice call of the second terminal is exemplified below.

In an example, the implementation of the Bluetooth chip receiving the instruction 1: the Bluetooth chip receives the instruction 1 sent by a controller in the wireless Bluetooth device, where the Bluetooth chip is connected to the controller. Priorities of the first terminal and the second terminal are pre-stored in the controller. If the priority of the second terminal is higher than the priority of the first terminal, the controller can determine that the call of the second terminal is allowed to be accessed, so as to send the instruction 1 to the above Bluetooth chip. The priorities of the first terminal and the second terminal can be set according to actual needs. For example, if a phone number of the user's first terminal is a work phone number specially set for work, the first terminal can be regarded as a terminal dedicated to answering work calls. If a phone number of the user's second terminal is a home phone number dedicated to family members, the second terminal can be regarded as a terminal dedicated to answering calls from the family members. The user can set the priorities of the first terminal dedicated to answering work calls and the second terminal dedicated to answering calls from the family members according to actual needs. For example, on weekdays, the priority of the first terminal can be set to be higher than that of the second terminal; on weekends, the priority of the first terminal can be set to be lower than that of the second terminal. It should be noted that this embodiment only provides the above implementation for setting the priority. In a specific implementation, the implementation of setting the priorities of the first terminal and the second terminal is not limited to the above example.

In another example, the implementation of the Bluetooth chip receiving the above-mentioned instruction 1: the Bluetooth chip receives the instruction 1 sent by a touch control chip in the wireless Bluetooth device, where the Bluetooth chip is connected to the touch control chip. In a specific implementation, after the call access instruction from the second terminal is received, the Bluetooth chip can control the wireless Bluetooth device to play a local ringtone to inform the user that the second terminal receives an incoming call, so that the user is notified that there is a call incoming from the second terminal when answering the call from the first terminal by using the wireless Bluetooth device. Herein, the local ringtone can be a pre-stored ringtone in the wireless Bluetooth device, and the local ringtone can be set by the user according to actual needs. Usually, the local ringtone can be set as a relatively short ringtone, so as to achieve effect of not only reminding the user that there is a call coming in on the second terminal, but also not affecting the user's answering the call of the first terminal. After the local ringtone is heard, the user can perform a preset first trigger operation on the wireless Bluetooth device. If the touch control chip in the wireless Bluetooth device detects the first trigger operation for indicating permission to access the call of the second terminal, it can be determined that the call of the second terminal is allowed to be accessed, so that the touch control chip sends the above-mentioned instruction 1 to the Bluetooth chip. Herein, the first trigger operation can be set according to actual needs, which is not specifically limited in this embodiment. For example, the first trigger operation may be a single-click operation, a double-click operation, or the like on the wireless Bluetooth device. In a specific implementation, if the Bluetooth chip itself has a touch function, the Bluetooth chip can determine that the above-mentioned instruction 1 is received when detecting the above first trigger operation. That is, if the second terminal is not within an access range of the hand of the user, the user can indicate that the call of the second terminal is allowed to be accessed through the first trigger operation on the wireless Bluetooth device.

In another example, the implementation of the Bluetooth chip receiving the above instruction 1: the Bluetooth chip receives the above instruction 1 sent by the second terminal. In a specific implementation, after the call access instruction from the second terminal is received, the Bluetooth chip can control the wireless Bluetooth device to play the local ringtone to inform the user that the second terminal receives an incoming call, so that the user is notified that there is a call incoming from the second terminal when answering the call from the first terminal by using the wireless Bluetooth device. Thus, the user can operate the second terminal to answer the call of the second terminal. For example, the user can touch an answering button on the second terminal, and after the answering button is touched, the second terminal sends the above instruction 1 to the Bluetooth chip.

It may be understood that, if the Bluetooth chip receives the above-mentioned instruction 1, it can be determined that the call of the second terminal is currently allowed to be accessed.

In a specific implementation, the Bluetooth chip sends the request for disconnecting the synchronous data connection to the first terminal, to disconnect the synchronous data connection between the first terminal and the Bluetooth chip, which may be referred to as releasing the synchronous data connection between the first terminal and the Bluetooth chip. Herein, the synchronous data connection established between the first terminal and the Bluetooth chip may be the SCO connection or the eSCO connection. Whether to establish the SCO connection or the eSCO connection or not depends on respective characteristics of the first terminal and the wireless Bluetooth device. For example, it is determined that both the first terminal and the Bluetooth chip support the eSCO connection according to the respective characteristics of the first terminal and the Bluetooth chip, the synchronization data connection established between the first terminal and the Bluetooth chip can be the eSCO connection. If it is determined that one of the first terminal and the Bluetooth chip does not support the eSCO connection, the synchronization data connection established between the first terminal and the Bluetooth chip can be the SCO connection.

In an example, before sending the request for disconnecting the synchronous data connection to the first terminal, in response to receiving the request for establishing the synchronous data connection sent by the second terminal, the Bluetooth does not respond the request for establishing the synchronous data connection sent by the second terminal within a preset time period, or sends a message refusing to establish the synchronous data connection to the second terminal. That is, the Bluetooth chip refuses to establish the synchronous data connection with the second terminal. That is, if the Bluetooth chip receives the call access instruction from the second terminal, and then receives the request for establishing the synchronous data connection from the second terminal, and the Bluetooth chip determines that the synchronous data connection established with the first terminal is not disconnected, the Bluetooth chip refuses to establish the synchronous data connection with the second terminal, so as to ensure that the Bluetooth chip only establishes the synchronous data connection with one terminal, which is conducive to reducing power consumption of the wireless Bluetooth device. Moreover, if the Bluetooth chip does not establish the synchronous data connection with the second terminal, the normal answering of the second terminal will not be affected, and the second terminal rings normally.

In a specific implementation, the implementation of the Bluetooth chip refusing to establish the synchronous data connection with the second terminal: after the request for establishing the synchronous data connection sent by the second terminal is received, the Bluetooth chip does not respond to the request within the preset time period, or the Bluetooth chip sends a message refusing to establish the synchronous data connection to the second terminal. Herein, the preset time period can be set according to actual needs, which is not specifically limited in this embodiment.

In operation 102, the voice call data packet is transmitted to the second terminal after the request for establishing the synchronous data connection sent by the second terminal is received.

In an example, the Bluetooth chip firstly sends a third instruction to the second terminal; where, the third instruction is used to trigger the second terminal to send the request for establishing the synchronous data connection to the Bluetooth chip. Subsequentially, the Bluetooth chip receives the request for establishing the synchronous data connection sent by the second terminal to complete establishment of the synchronous data connection between the second terminal and the Bluetooth chip. That is, if the second terminal receives the third instruction, the second terminal sends the request for establishing the synchronous data connection to the Bluetooth chip to complete the establishment of the synchronous data connection between the Bluetooth chip and the second terminal, so that the Bluetooth chip can access the voice call of the second terminal, thereby transmitting the voice call data packet to the second terminal.

In an example, the third instruction is a third AT (attention) instruction, and the AT instruction can be applied to connection and communication between the terminal and the Bluetooth chip. The AT instruction is a string that starts with AT and ends with a character. In this embodiment, the third AT instruction is expressed as an AT+BCC instruction; where, BCC is a Bluetooth codec connection, BCC.

In an example, it can be determined that the synchronous data connection that can be established between the second terminal and the Bluetooth chip is the SCO connection according to the characteristics of the second terminal and the Bluetooth chip, and the Bluetooth chip can send the AT+BCC instruction to the second terminal. After the AT+BCC instruction is received, the second terminal sends a SCO connection establishment request (i.e., a request for establishing the SCO connection) to the Bluetooth chip, so that the SCO connection is established between the second terminal and the Bluetooth chip, and the Bluetooth chip can transmit the voice call data packet to the second terminal. That is, the Bluetooth chip synchronizes the voice call data packet during the voice call with the second terminal. For example, when there is an incoming call from the second terminal of the user, after the Bluetooth chip establishes the SCO connection with the second terminal, the Bluetooth chip can package collected voice messages sent by the user during the call into the voice call data packet, and then send the voice call data packet to the second terminal.

In another example, it can be determined that the synchronous data connection that can be established between the second terminal and the Bluetooth chip is the eSCO connection according to the characteristics of the second terminal and the Bluetooth chip, and the Bluetooth chip can send the AT+BCC instruction to the second terminal. After the AT+BCC instruction is received, the second terminal sends an eSCO connection establishment request (i.e., a request for establishing the eSCO connection) to the Bluetooth chip, so that the eSCO connection is established between the second terminal and the Bluetooth chip, and the Bluetooth chip can transmit the voice call data packet to the second terminal. That is, the Bluetooth chip synchronizes the voice call data packet during the voice call with the second terminal.

It may be understood that the Bluetooth protocol stipulates that the request for establishing the synchronous data connection should be sent by the terminal receiving the incoming call to the Bluetooth chip built in the wireless Bluetooth device. In this embodiment, since the Bluetooth chip does not disconnect the synchronous data connection with the first terminal after the second terminal sends a request for establishing the synchronous data connection to the Bluetooth chip for the first time, the Bluetooth chip refuses to establish the synchronous data connection with the second terminal. If the Bluetooth chip wants to establish the synchronous data connection with the second terminal after disconnecting the synchronous data connection established with the first terminal, the Bluetooth chip can send the third instruction to the second terminal to trigger the second terminal to send the request for establishing the synchronous data connection to the Bluetooth chip. Therefore, the Bluetooth chip receives the request for establishing the synchronous data connection sent by the second terminal for the second time, so as to complete the establishment of the synchronous data connection between the Bluetooth chip and the second terminal. That is, the embodiments of the present disclosure can reduce data communication load and reduce power consumption of the wireless Bluetooth device on a basis of complying with the existing Bluetooth protocol.

In a specific implementation, after receiving the request for establishing the synchronous data connection sent by the second terminal and before transmitting the voice call data packet to the second terminal, the method further includes: sending a fourth instruction to the second terminal; where the fourth instruction is used to instruct the second terminal to transmit the voice call data packet to the Bluetooth chip; receiving a fourth response message to the fourth instruction from the second terminal; where the fourth response message is used to indicate that the voice call data packet is transmitted to the Bluetooth chip by the second terminal. The fourth instruction is used to instruct the second terminal to answer the incoming call, and it can also be understood that the fourth instruction is used to instruct the second terminal to transmit the voice call data packet to the Bluetooth chip. The fourth response message is used to indicate that the second terminal answers the incoming call, and it can also be understood that the fourth response message is used to indicate that the second terminal transmits the voice call data packet to the Bluetooth chip. Herein, the Bluetooth chip sends the fourth instruction to the second terminal to instruct the second terminal to answer the incoming call, so that the user does not need to pick up the second terminal and manually answer the incoming call of the second terminal. Even if the second terminal is not at hand of the user, the user does not need to search for the second terminal and manually answers the incoming call of the second terminal, which is more convenient for the user.

In an example, the fourth instruction is a fourth AT instruction, which can be specifically expressed as an AT+ATA instruction; where, ATA is short for answer AT. The fourth response message is expressed as: +CIEV (call=1, callsetup=0), where callsetup=0 means that the second terminal answers the incoming call, and there is no call currently, call=1 means that there is a call currently, that is, the call of the second terminal.

For ease of understanding, the first terminal, the second terminal, the Bluetooth chip, and the synchronous data connection are described by taking mobile phone A, mobile phone B, the Bluetooth chip in the wireless Bluetooth headset and the SCO connection as examples. In addition, for ease of description, the Bluetooth chip in the wireless Bluetooth headset is hereinafter referred to as the wireless Bluetooth headset.

Figure 2:
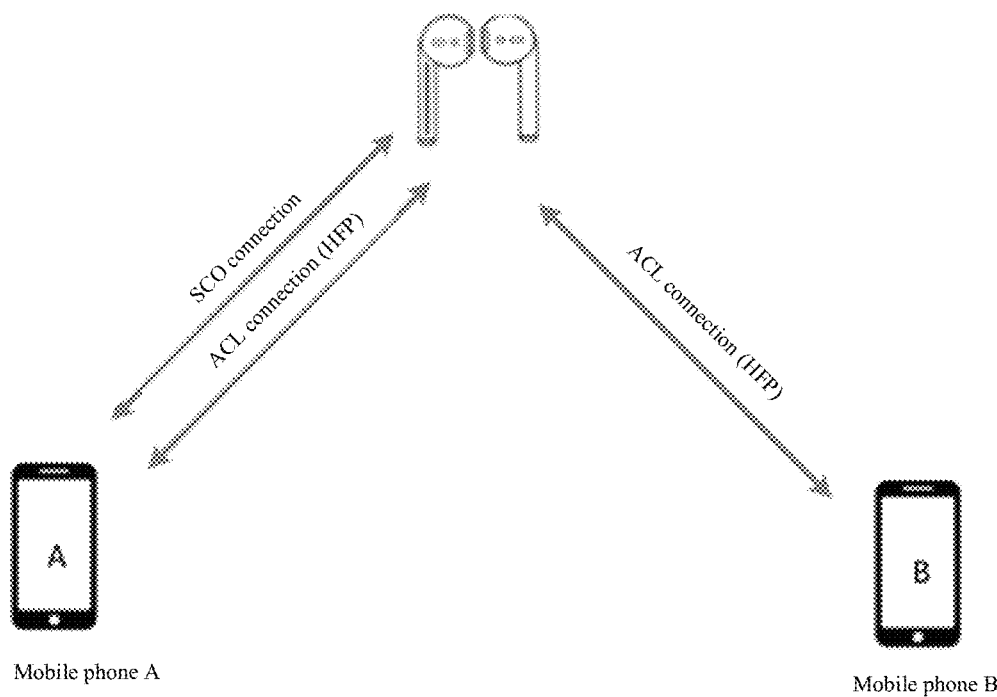
FIG. 2 is a schematic diagram of a scenario where a mobile phone B also calls after a wireless Bluetooth headset accesses a call of a mobile phone A according to the first embodiment of the present disclosure.

Reference may be made to FIG. 2, which is a where a mobile phone B also calls after a wireless Bluetooth headset accesses a call of a mobile phone A., where both the mobile phone A and the mobile phone B complete the Bluetooth pairing connection with the wireless Bluetooth headset, and the ACL connection and the HFP connection are established.

Since the HFP connection is established based on the ACL connection, the ACL connection (HFP) in FIG. 2 can be understood as that the ACL connection is established, and the HFP connection is established based on the ACL connection. When the wireless Bluetooth headset accesses the call of the mobile phone A, that is, when the user answers the call of the mobile phone A by using the wireless Bluetooth headset, the SCO connection is established between the mobile phone A and the wireless Bluetooth headset. At this time, after the mobile phone B calls, if the mobile phone B sends the SCO connection establishment request to the wireless Bluetooth headset, and it is determined that the wireless Bluetooth headset establishes the SCO connection with mobile phone A at this time, a second SCO connection may not be established. Therefore, the wireless Bluetooth headset refuses to respond to the SCO connection establishment request from the mobile phone B. Further, referring to FIG. 3 which is a schematic diagram of disconnecting the SCO connection between the mobile phone A and the wireless Bluetooth headset, and then establishing the SCO connection between the mobile phone B and the wireless Bluetooth headset, it can be ensured that the wireless Bluetooth headset always establishes one SCO connection with one mobile phone.

It should be noted that the above examples in this embodiment are only provided for ease of understanding, and do not constitute any limitation on the technical solutions of the present disclosure.

Compared with the prior art, in this embodiment, in the process that the Bluetooth chip transmits the voice call data packet with the first terminal, that is, in the process that the user answers the call of the first terminal through the Bluetooth chip, if the second terminal calls, the second terminal sends the voice call request instruction to the Bluetooth chip. After receiving the voice call request instruction, and receiving the instruction for indicating permission to access the voice call of the second terminal, the Bluetooth chip sends the request for disconnecting the synchronous data connection to the first terminal, so as to disconnect the synchronous data connection established between the first terminal and the Bluetooth chip. Then, after the request for establishing the synchronous data connection sent by the second terminal is received, the Bluetooth chip transmits the voice call data packet to the second terminal. That is, after disconnecting the synchronous data connection established with the first terminal, the Bluetooth chip establishes the synchronous data connection with the second terminal based on the request for establishing the synchronous data connection sent by the second terminal, so that the user answers the call of the second terminal through the Bluetooth chip. Therefore, in the scenario where the Bluetooth chip faces incoming calls from multiple terminals, there is no need to establish multiple synchronous data connections on a Bluetooth chip side, which reduces data communication load and reduces power consumption of the Bluetooth chip. In addition, the disconnection of the synchronous data connection established between the first terminal and the Bluetooth chip only indicates that the voice call data packet is currently unable to be transmitted between the first terminal and the Bluetooth chip, that is, the user is currently unable to answer the voice call of the first terminal through the Bluetooth chip, but does not mean hanging up the call of the first terminal, which will not affect the normal conversation of the user to a certain extent.

Moreover, when the synchronous data connection is the eSCO connection, one eSCO connection occupies one ACL link alone. In the prior art, when the first terminal is on a call, if there is an incoming call from the second terminal, the wireless Bluetooth device establishes the eSCO connection with both the first terminal and the second terminal, that is, there are two eSCO connections which occupy two ACL links. However, address space in the Bluetooth chip is limited. Both the ACL link and the eSCO link occupy the limited address space in the Bluetooth chip. In the limited address space, if the address space occupied by the eSCO link increases, the address space for establishing the ACL links will be relatively reduced, that is, the number of the ACL links that can be established will be reduced, but the ACL link is the basis for data communication between the terminal and the Bluetooth chip. Therefore, the number of the terminals that the Bluetooth chip connected to will be affected. Compared with the prior art, in the embodiment of the present disclosure, the eSCO link can be saved, that is, the occupied address space can be saved, the saved address space can be used to establish more ACL links, that is, more terminals are allowed to establish the ACL link with the Bluetooth chip, so that the Bluetooth chip can perform data communication with more terminals based on established ACL links. That is, the number of terminals that the Bluetooth chip connected to can also be increased to a certain extent.

A second embodiment of the present disclosure relates to a voice call method. The implementation details of the voice call method of this embodiment will be specifically described below, and the following contents are only provided for ease of understanding, and are not necessary for implementing this solution.

Figure 4:
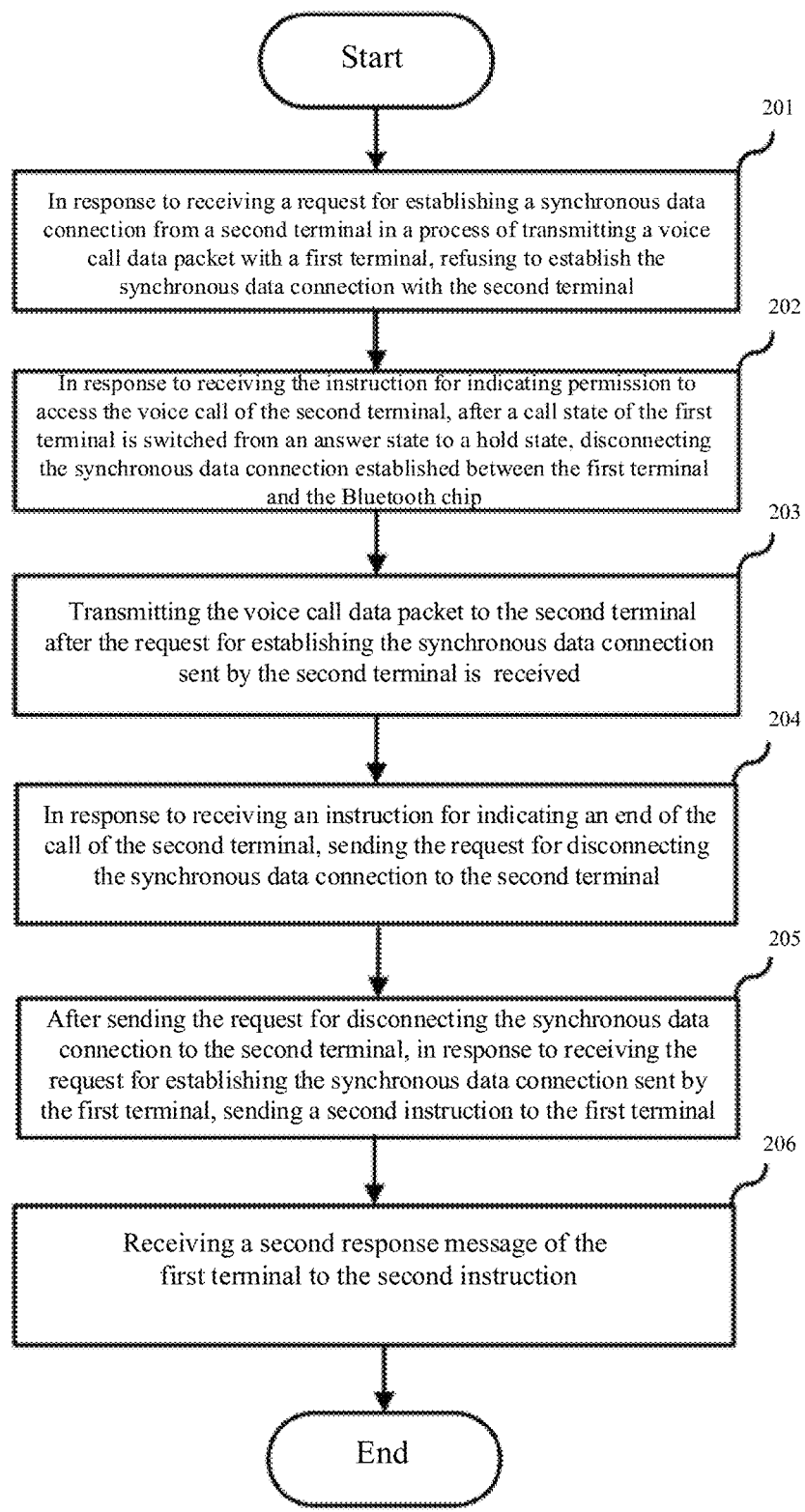
FIG. 4 is a flowchart of a voice call method according to a second embodiment of the present disclosure.

As shown in FIG. 4, the voice call method in this embodiment specifically includes the following operations.

In operation 201, in response to receiving a request for establishing a synchronous data connection from a second terminal in a process of transmitting a voice call data packet with a first terminal, the synchronous data connection with the second terminal is refused to be established.

Herein, if the request for establishing the synchronous data connection from the second terminal is received, it means that an incoming call has been received by the second terminal, and a voice call request instruction has been sent by the second terminal to a Bluetooth chip. In a specific implementation, the implementation of refusing to establish the synchronous data connection with the second terminal is: after the request for establishing the synchronous data connection sent by the second terminal is received, the Bluetooth chip does not respond to the request within a preset time period, or the Bluetooth chip sends a message refusing to establish the synchronous data connection to the second terminal. Herein, the preset time period can be set according to actual needs, which is not specifically limited in this embodiment.

In operation 202, in response to receiving the instruction for indicating permission to access the voice call of the second terminal, after a call state of the first terminal is switched from an answering state to a holding state, the synchronous data connection established between the first terminal and the Bluetooth chip is disconnected.

The specific implementation of receiving the instruction for indicating permission to access the voice call of the second terminal, disconnecting the synchronous data connection established between the first terminal and the Bluetooth chip are substantially the same as the related descriptions of the first embodiment, and are not repeated here in order to avoid repetition. The differences between this embodiment and the first embodiment are mainly described below.

In this embodiment, before disconnecting the synchronous data connection established between the first terminal and the Bluetooth chip, that is, before the first terminal sends a request for disconnecting the synchronous data connection, the method further includes: switching the call state of the first terminal from the answering state to the holding state. That is, after a wireless Bluetooth device accesses a call of the first terminal, if the wireless Bluetooth device receives a call access instruction from the second terminal and it is determined that a call of the second terminal is allowed to be accessed, the wireless Bluetooth device first switches the call state of the first terminal from the answering state to the holding state, and then disconnects the synchronous data connection established between the first terminal and the Bluetooth chip, which facilitates subsequent restoration of the call state of the first terminal to the answering state according to actual needs, and improves call experience.

In an example, the implementation of the Bluetooth chip switching the call state of the first terminal from the answering state to the holding state is as follows.

Firstly, the Bluetooth chip sends a first instruction to the first terminal; where, the first instruction is used to instruct the first terminal to switch the call state from the answering state to the holding state. That is, after the first instruction is received, the first terminal switches a current call state from the answering state to the holding state. In a specific implementation, the first instruction is a first AT instruction, which is specifically expressed as an AT+CHLD=2 instruction; where, GILD is short for call held up. The AT+CHLD=2 instruction is used to instruct a terminal receiving the instruction to switch the current call state. If the current call state of the terminal is the answering state, the terminal switches to the holding state; if the current call state of the terminal is the holding state, the terminal switches to the answering state. In this operation, since the current call state of the first terminal is the answering state, after the AT+CHLD=2 instruction is received, the first terminal switches the current call state from the answering state to the holding state.

After that, the Bluetooth chip receives a first response message from the first terminal to the first instruction; where, the first response message is used to indicate that the current call state of the first terminal is the holding state. That is, after the current call state is switched from the answering state to the holding state, the first terminal feedbacks the current call state to the Bluetooth chip, so that the Bluetooth chip can determine that the first terminal successfully completes a switch of the call state according to the first instruction. In a specific implementation, the first response message is expressed as: +CIEV (callheld=2); where, callheld=2 is call state information carried by the +CIEV instruction, and callheld=2 indicates that the current call state of the first terminal is call holding, that is, the holding state.

In operation 203, the voice call data packet is transmitted to the second terminal after the request for establishing the synchronous data connection sent by the second terminal is received.

The operation 203 is substantially the same as the operation 102 in the first embodiment, which will not be repeated here in order to avoid repetition.

Figure 3:
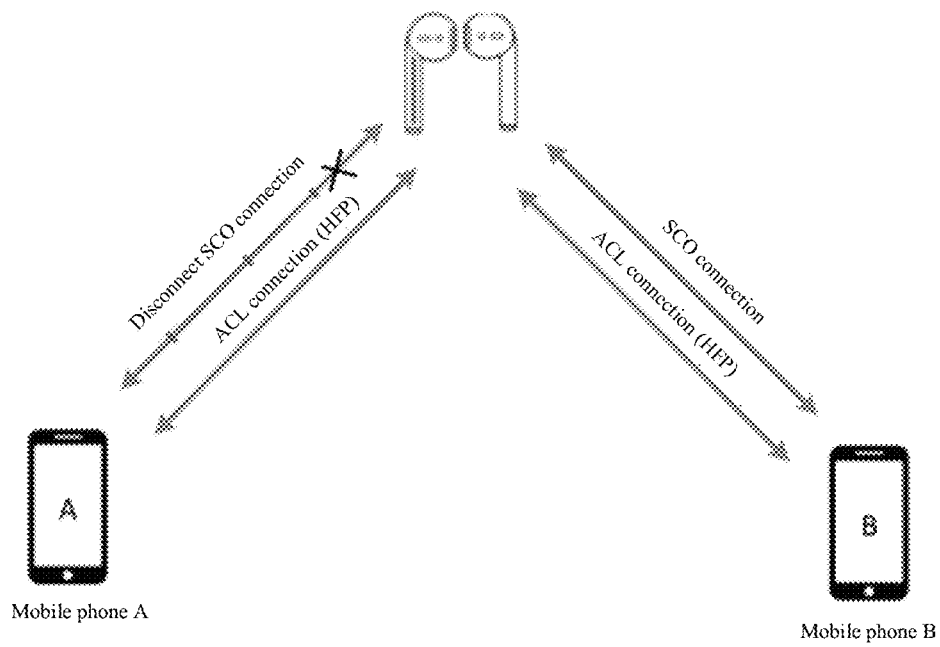
FIG. 3 is a schematic diagram of disconnecting a synchronous connection-oriented (SCO) connection between the mobile phone A and the wireless Bluetooth headset and then establishing the SCO connection between the mobile phone B and the wireless Bluetooth headset according to the first embodiment of the present disclosure.

For ease of understanding, referring to FIG. 3, after accessing a call of a mobile phone A, if a call access instruction of a mobile phone B is received and it is determined that a call of the mobile phone B is allowed to be accessed, a call state of the mobile phone A is switched from the answering state to the holding state, SCO connection established between the mobile phone A and the wireless Bluetooth headset is disconnected, and then the SCO connection between the mobile phone B and the wireless Bluetooth headset is established to access the call of the mobile phone B.

In operation 204, in response to receiving an instruction for indicating an end of the call of the second terminal, the request for disconnecting the synchronous data connection is sent to the second terminal.

Herein, in response to receiving the instruction for indicating the end of the call of the second terminal, sending the request for disconnecting the synchronous data connection to the second terminal can also be understood as: in response to detecting the end of the call of the second terminal, the synchronous data connection between the second terminal and the Bluetooth chip is disconnected.

In an example, the call of the second terminal is ended actively. The ended actively can be understood as: the user actively hangs up the call of the second terminal by using the wireless Bluetooth device. For example, the user performs a preset third trigger operation for indicating hanging up the call on the wireless Bluetooth device. After the third triggering operation is detected, a touch control chip in the wireless Bluetooth device=determines that the user wants to hang up the call, so that the touch control chip sends the instruction for indicating the end of the call of the second terminal to the Bluetooth chip. In a specific implementation, since the user does not directly operate the second terminal, the Bluetooth chip sends a hang-up instruction to the second terminal to notify the second terminal to hang up the call being answered. In a specific implementation, the hang-up instruction is expressed as: an AT+CHUP instruction; where, CHUP is short for call hang up. In another example, the end actively can also be understood as: the user actively touches a hang-up button on the second terminal, and after detecting that the hang-up button is touched, the second terminal sends the instruction for indicating the end of the call of the second terminal to the Bluetooth chip.

In another example, the call of the second terminal is ended passively. The ended passively can be understood as: a calling party calling the second terminal actively hangs up the call, so that the called second terminal passively ends the call. After detecting that the call is ended passively, the second terminal sends the instruction for indicating the end of the call of the second terminal to the Bluetooth chip.

In a specific implementation, the Bluetooth chip sends the request for disconnecting the synchronous data connection to the second terminal, thereby disconnecting the synchronous data connection between the second terminal and the Bluetooth chip.

In operation 205, after the request for disconnecting the synchronous data connection is sent to the second terminal, in response to receiving the request for establishing the synchronous data connection sent by the first terminal, a second instruction is sent to the first terminal.

Herein, the second instruction is used to instruct the first terminal to switch the call state from the holding state to the answering state.

In one example, the Bluetooth chip sends the request for disconnecting the synchronous data connection to the second terminal, which can be understood that the Bluetooth chip disconnects the synchronous data connection with the second terminal. At this time, if the Bluetooth chip detects that the call state of the first terminal is the holding state, the Bluetooth chip can trigger the first terminal to send the request for establishing the synchronous data connection to the Bluetooth chip, so that the Bluetooth chip can receive the request for establishing the synchronous data connection sent by the first terminal. In this way, the Bluetooth chip establishes the synchronous data connection with the first terminal, and then sends the second instruction to the first terminal.

In one example, the implementation of the Bluetooth chip detecting that the call state of the first terminal is the call hold is: the first terminal and the Bluetooth chip perform state transmission based on established HFP connection, and the transmitted state includes but not limited to the call state of the first terminal, so that the Bluetooth chip is notified whether the call state of the first terminal is the call holding state.

In one example, the implementation of the Bluetooth chip triggering the first terminal to send the request for establishing the synchronous data connection to the Bluetooth chip is: the Bluetooth chip sends a third instruction to the first terminal, and the third instruction triggers the first terminal to send the request for establishing the synchronous data connection to the Bluetooth chip. Then, the Bluetooth chip receives the request for establishing the synchronous data connection sent by the first terminal, thereby establishing the synchronous data connection between the first terminal and the Bluetooth chip. Herein, the third instruction is a third AT instruction, and the third AT instruction is expressed as an AT+BCC instruction. After the AT+BCC instruction is received, the first terminal sends the request for establishing the synchronous data connection to the Bluetooth chip, thereby establishing the synchronous data connection between the Bluetooth chip and the first terminal.

In one example, the Bluetooth chip sends the second instruction to the first terminal to instruct the first terminal to switch the call state from the holding state to the answering state. That is, after the second instruction is received, the first terminal switches the call state from the holding state to the answering state. In a specific implementation, the second instruction is a second AT instruction, which is specifically expressed as an AT+CHLD=2 instruction. From the above description for the first instruction and the second instruction, both the first instruction and the second instruction is expressed as: the AT+CHLD=2 instruction. The AT+CHLD=2 instruction is used to instruct the terminal receiving the instruction to switch the current call state. If the current call state of the terminal is the answering state, the terminal switches to the holding state; if the current call state is the holding state, the terminal switches to the answering state. In this operation, since the current call state of the first terminal is the holding state, the first terminal switches the current call state from the holding state to the answering state upon receiving the AT+CHLD=2 instruction.

In operation 206, a second response message of the first terminal to the second instruction is received.

The second response message is used to indicate that the current call state of the first terminal is the answering state. That is, after the current call state is switched from the holding state to the answering state, the first terminal feedbacks the current call state to the Bluetooth chip, so that the Bluetooth chip can determine that the first terminal successfully completes the switch of the call state according to the second instruction. In a specific implementation, the second response message is expressed as: +CIEV (callsetup=0).

For ease of understanding, the first terminal, the second terminal, the Bluetooth chip, and the synchronous data connection are respectively illustrated with the mobile phone A, the mobile phone B, the Bluetooth chip in the wireless Bluetooth headset and the SCO connection as examples. In addition, for ease of description, the Bluetooth chip in the wireless Bluetooth headset is hereinafter referred to as the wireless Bluetooth headset.

Figure 5:
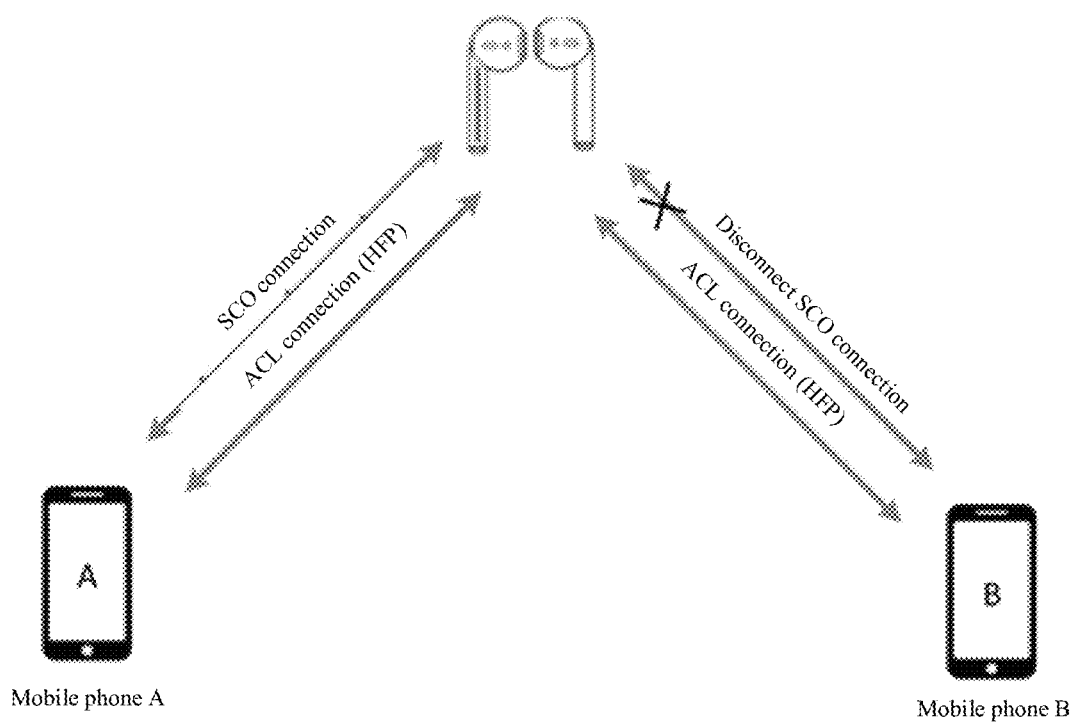
FIG. 5 is a schematic diagram of recovering a call of the mobile phone A after hanging up a call of the mobile phone B according to the second embodiment of the present disclosure.

FIG. 5 is a schematic diagram of recovering the call of the mobile phone A after hanging up the call of the mobile phone B. Referring to FIG. 5, after the call of mobile phone B is hung up, the wireless Bluetooth headset triggers the mobile phone B to disconnect the SCO connection with the wireless Bluetooth headset, and then the SCO connection between the mobile phone A and the wireless Bluetooth headset is established. Then, the call state of mobile phone A is switched to the answering state and the call of the mobile phone A is resumed. That is, in the scenario of multi-connection and multi-phone access, this embodiment can ensure the seamless handover of the phones, and there is only one synchronous connection link at most at the wireless Bluetooth headset side from beginning to end, that is, only one synchronous data connection is established, which greatly reduce link load when the mobile phone is accessed.

Figure 6:
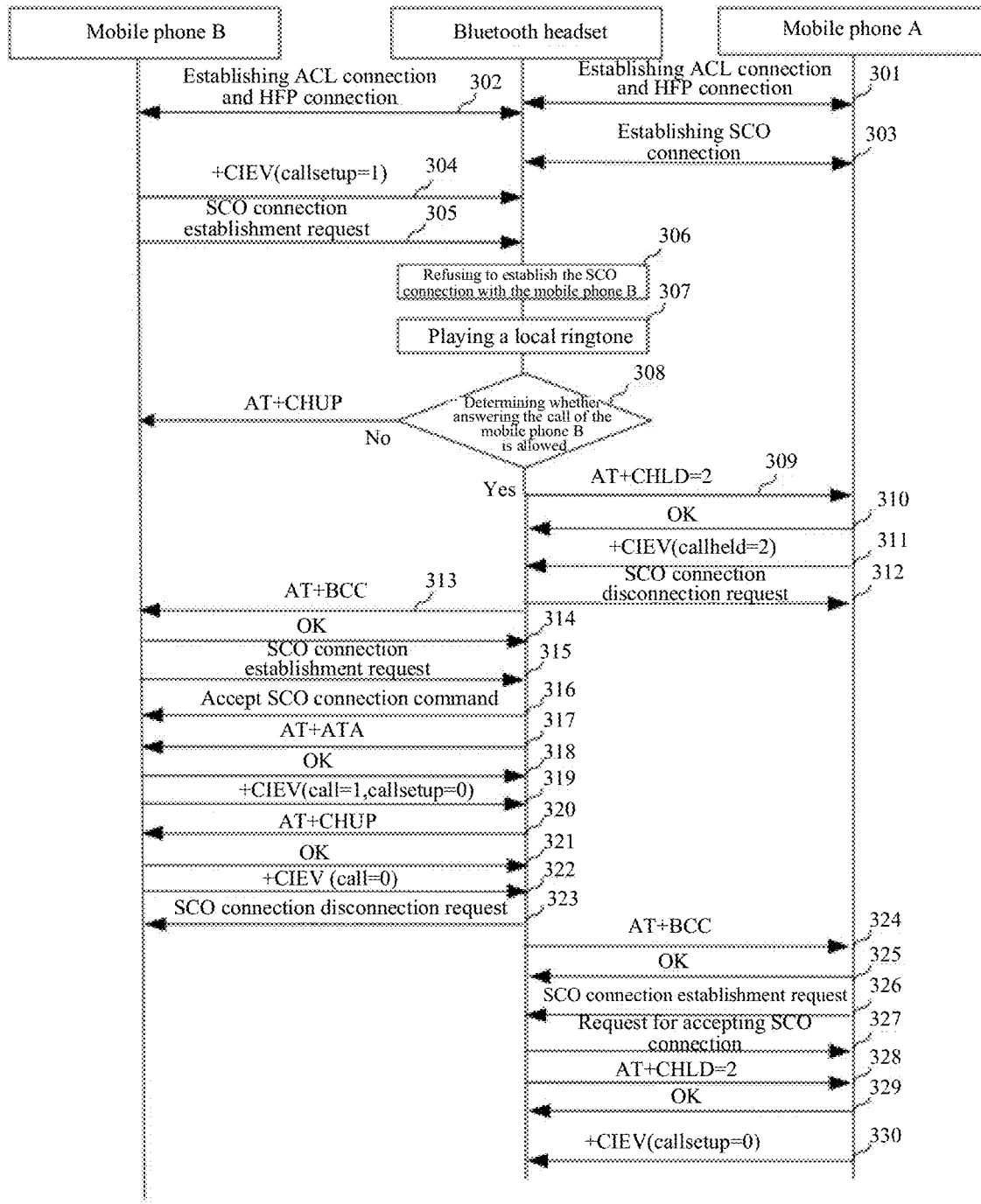
FIG. 6 is a schematic diagram of interaction between the mobile phone A, the mobile phone B, and the wireless Bluetooth headset according to the second embodiment of the present disclosure.

In one example, in order to realize the voice call method in this embodiment, a schematic diagram of interaction between the mobile phone A, the mobile phone B, and the wireless Bluetooth headset (hereinafter referred to as Bluetooth headset) is provided, reference may be made to FIG. 6.

In operation 301, an ACL connection and an HFP connection are established between the Bluetooth headset and the mobile phone A.

In operation 302, the ACL connection and the HFP connection are established between the Bluetooth headset and the mobile phone B.

In operation 303, a call is accessed by the mobile phone A, establishes the SCO connection is established between the mobile phone A and the Bluetooth headset (accessed first, and the SCO connection is established subsequentially), and the call is started.

So far, the mobile phone A and the Bluetooth headset are in a calling with each other.

In operation 304, a call is accessed by the mobile phone B, and a +CIEV (callsetup=1) instruction is sent by the mobile phone B to the Bluetooth headset.

The +CIEV (callsetup=1) instruction is sent to notify the Bluetooth headset that the mobile phone B has an incoming call, and the +CIEV (callsetup=1) instruction is the call access instruction. As stipulated by the Bluetooth protocol, the notification intends to inform the Bluetooth headset of the state of the mobile phone. In this operation, the notification intends to inform the Bluetooth headset that the mobile phone B has an incoming call.

In operation 305, a SCO connection establishment request is sent by the mobile phone B to the Bluetooth headset. Herein, the SCO connection establishment request may also be referred to as a request for establishing the SCO connection.

In operation 306, the SCO connection is refused by the Bluetooth headset to be established with the mobile phone B.

It may be understood that in response to the SCO connection being refused to be established, the normal answering and user experience of the mobile phone B will not be affected, and the mobile phone B normally rings at this time.

In operation 307, a local ringtone is played by the Bluetooth headset to inform the user that there is an incoming call from another mobile phone, that is, the mobile phone B.

In operation 308, it is determined whether the call of the mobile phone B is allowed to be answered or not. If the call of the mobile phone B is allowed to be answered, operation 309 is performed; otherwise, the call is directly hung up. An AT+CHUP instruction is sent by the Bluetooth headset to the mobile phone B, to instruct the mobile phone B to hang up the call.

In operation 309, an AT+CHLD=2 instruction is sent by the Bluetooth headset to the mobile phone A, to instruct the mobile phone A to switch the call state from the answering state to the holding state, to hold the call of the mobile phone A.

In operation 310, an OK response is replied by the mobile phone A to the Bluetooth headset, to indicate that the AT+CHLD=2 instruction is received by the mobile phone A.

In operation 311, +CIEV (callheld=2) is replied by the mobile phone A to the Bluetooth headset, to indicate that the call state of the mobile phone A is currently the holding state.

In operation 312, a SCO connection disconnection request is sent by the Bluetooth headset to the mobile phone A, to disconnect the SCO connection with the mobile phone A, where the SCO connection disconnection request may also be referred to as a request for disconnecting the SCO connection.

In operation 313, an AT+BCC instruction is sent by the Bluetooth headset to the mobile phone B, to trigger the mobile phone B to initiate the SCO connection establishment request.

In operation 314, the OK response is sent by the mobile phone B to the Bluetooth headset, to indicate that the AT+BCC instruction of the Bluetooth headset is received.

In operation 315, the SCO connection establishment request is sent by the mobile phone B to the Bluetooth headset.

In operation 316, it is determined by the Bluetooth headset to accept the SCO connection establishment request initiated by the mobile phone B, where the Bluetooth headset sends an instruction of "accepting SCO connection" to the mobile phone B.

So far, the SCO connection is established between the Bluetooth headset with the mobile phone B.

In operation 317, an AT+ATA instruction is sent by the Bluetooth headset to the mobile phone B, to instruct the mobile phone B to answer the call.

In operation 318, the OK response is replied by the mobile phone B, to indicate that the mobile phone B receives the AT+ATA instruction is received by the mobile phone B.

In operation 319, +CIEV (call=1, callsetup=0) instruction is sent by the mobile phone B to the Bluetooth headset to notify the current state of the mobile phone B to the Bluetooth earphone. In a specific implementation, +CIEV (call=1) is sent firstly, and +CIEV (callsetup=0) is sent subsequentially.

So far, the Bluetooth headset and the mobile phone B are in a process of voice call.

In operation 320, the call of the mobile phone B is actively or passively hung up by the Bluetooth headset (if the call is actively hung up by Bluetooth headset, the AT+CHUP instruction is sent to the mobile phone B, and the call of the mobile phone B is hung up).

In operation 321, the OK response is replied by the mobile phone B, to indicate that the AT+CHUP instruction is received by the mobile phone B.

In operation 322, +CIEV (call=0) instruction is sent by the mobile phone B to the Bluetooth headset to notify the Bluetooth headset that the voice call of the mobile phone B is ended.

In operation 323, a request for disconnecting the SCO connection is sent by the Bluetooth headset to the mobile phone B.

So far, the SCO connection between the Bluetooth headset and the mobile phone B is disconnected, that is, the SCO connection between the mobile phone B and the Bluetooth headset is released.

In operation 324, the AT+BCC instruction is sent by the Bluetooth headset to the mobile phone A, to trigger the mobile phone A to initiate the SCO connection establishment request.

In operation 325, the OK response is sent by the mobile phone A to the Bluetooth headset, to indicate that the AT+BCC instruction is received by the mobile phone A.

In operation 326, the SCO connection establishment request is sent by the mobile phone A to the Bluetooth headset.

In operation 327, it is determined by the Bluetooth headset to accept the SCO connection establishment request initiated by the mobile phone A, where, an instruction of "accepting SCO connection" is sent by the Bluetooth headset to the mobile phone A.

So far, the SCO connection is re-established by the mobile phone A with the Bluetooth headset.

In operation 328, the AT+CHLD=2 instruction is sent by the Bluetooth headset to the mobile phone A, to switch the call state of the mobile phone A to the answering state.

In operation 329, the OK response is sent by the mobile phone A, to indicate that the AT+CHLD=2 instruction for switching the call state is received.

In operation 330, the +CIEV (callsetup=0) instruction is sent by the mobile phone A to the Bluetooth headset to notify the current state of the mobile phone A to the Bluetooth headset.

So far, the call with the mobile phone A is resumed by the Bluetooth headset.

It should be noted that the above examples in the present embodiment are all provided for ease of understanding, and do not constitute a limitation to the technical solutions of the present disclosure.

Compared with the prior art, in this embodiment, it is convenient to subsequentially restore the call state of the first terminal to the answering state according to actual needs, to improve call experience. The first instruction is sent to the first terminal to instruct the first terminal to switch the call state from the answering state to the holding state, which facilitates the first terminal to switch the call state from the answering state to the holding state under the instruction of the first instruction. The first response message from the first terminal for indicating that the current call state of the first terminal is the holding state is received, so that the Bluetooth chip can clearly understand the current actual call state of the first terminal, and ensure that the first terminal successfully responds to the first instruction and ensure the smooth completion of switching the call state. Moreover, after the call of the second terminal ends, the Bluetooth chip disconnects the synchronous data connection with the second terminal, and re-establishes the synchronous data connection with the first terminal. That is, it is ensured firstly that the Bluetooth chip currently only establishes the synchronous data connection with one terminal, and then the call state of the first terminal is switched to the answering state, which is conducive to reducing power consumption of the Bluetooth chip while facilitating the user to continue to answer the call of the first terminal through the Bluetooth chip. That is, the call of the first terminal is restored through the Bluetooth chip, which is conducive to improving user experience.

A third embodiment of the present disclosure relates to a voice call method, applied to a first chip. The first chip is built in a first terminal, and the first terminal may be a first mobile phone or other devices with a dialing function. The implementation details of the voice call method of this embodiment will be specifically described below, and the following contents are only provided for ease of understanding, and are not necessary for implementing this solution.

Figure 7:
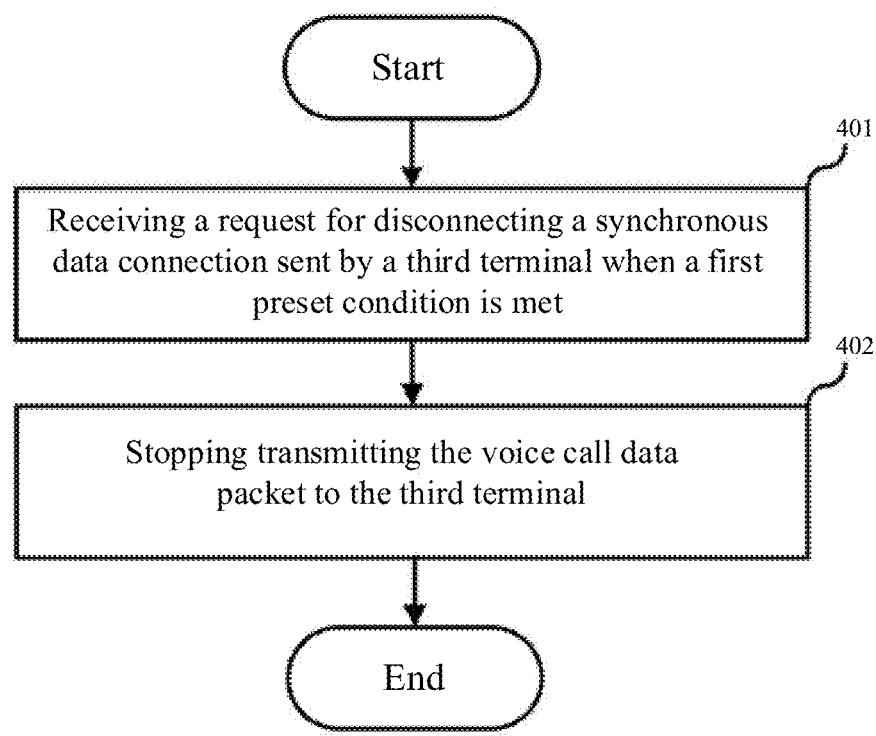
FIG. 7 is a flowchart of a voice call method according to a third embodiment of the present disclosure.

Reference is made to FIG. 7 for a flowchart of the voice call method of this embodiment, and the following operations are included.

In operation 401, a request for disconnecting synchronous data connection sent by a third terminal when a first preset condition is met is received.

The third terminal may be a wireless Bluetooth device and the wireless Bluetooth device may be a wireless Bluetooth headset, a Bluetooth speaker, a Bluetooth watch, and the like. For ease of description, the third terminal is represented by the wireless Bluetooth device in the following content.

In one example, the first preset condition includes: a voice call request instruction from a second terminal is received by the third terminal in a process of transmitting a voice call data packet with a first chip. The second terminal may be a second mobile phone or other devices with the dialing function. That is, if the third terminal receives the voice call request instruction from the second terminal in the process of transmitting the voice call data packet with the first chip, the third terminal can send a request for disconnecting the synchronous data connection to the first chip, so as to disconnect the synchronous data connection between the third terminal and the first chip.

In another example, the first preset condition includes: the voice call request instruction from the second terminal and an instruction for indicating permission to access a voice call of the second terminal are received by the third terminal in the process of transmitting the voice call data packet with the first chip. That is, if the third terminal receives the voice call request instruction from the second terminal and receives the instruction for indicating permission to access the voice call of the second terminal in the process of transmitting the voice call data packet with the first chip, the third terminal can send the request for disconnecting the synchronous data connection to the first chip, so as to disconnect the synchronous data connection between the third terminal and the first chip.

In a specific implementation, after the request for disconnecting the synchronous data connection sent by the wireless Bluetooth device is received by the first chip when the first preset condition is met, the synchronous data connection established between the first chip and the wireless Bluetooth device is disconnected. It may also be understood that the synchronous data connection established between the first terminal built with the first chip and the wireless Bluetooth device is disconnected.

In one example, the synchronous data connection is: an eSCO connection.

In operation 402, transmitting the voice call data packet to the third terminal is stopped.

That is, the first chip stop transmitting the voice call data packet to the third terminal.

In one example, before the first chip receives the request for disconnecting the synchronous data connection sent by the third terminal when the preset condition is met, the method further includes: receiving a first instruction sent by the third terminal, where the first instruction is used to indicate the first chip to switch a call state from an answering state to a holding state; and sending a first response message to the first instruction to the third terminal; where the first response message is used to indicate that the call state of the first chip is currently the holding state. It may also be understood that the first terminal with the first chip receives the first instruction sent by the third terminal, where the first instruction is used to instruct the first terminal built with the first chip to switch the call state from the answering state to the holding state. Then, the first terminal built with the first chip sends the first response message to the first instruction to the third terminal, where the first response message is used to indicate that the current call state of the first terminal with the first chip is the holding state.

In one example, after the first response message to the first instruction is sent by the first chip to the third terminal, the method further includes the following operation.

A request for establishing the synchronous data connection is sent to the third terminal when a second preset condition is met, where the second preset condition includes: the third terminal receives an instruction for indicating an end of a call of the second terminal is received by the third terminal, and a request for disconnecting the synchronous data connection is sent by the third terminal to the second terminal. After that, a second instruction sent by the third terminal is received by the first chip, where the second instruction is used to instruct the first chip to switch the call state from the holding state to the answering state. Subsequently, a second response message to the second instruction is sent by the first chip to the third terminal, where the second response message is used to indicate that the current call state of the first chip is the answering state.

In one example, before sending the request for establishing the synchronous data connection to the third terminal when the second preset condition is met, the method further includes: receiving a third instruction sent by the third terminal, where the third instruction is used to trigger the first chip to send the request for establishing the synchronous data connection to the third terminal. The third instruction is a third AT instruction. In this embodiment, the third AT instruction is expressed as an AT+BCC instruction. The AT+BCC instruction is used to trigger a party that receives the instruction to send the request for establishing the synchronous data connection. In this example, the party that receives the AT+BCC instruction is the first chip.

It is not difficult to find that this embodiment is an embodiment corresponding to the first embodiment and the second embodiment, the voice call method of this embodiment is applied to the first chip, and the voice call method of the first embodiment and the second embodiment are applied to the Bluetooth chip. This embodiment can be implemented in cooperation with the first embodiment and the second embodiment. The relevant technical details and technical effects mentioned in the first embodiment and the second embodiment are still valid in this embodiment, which will not be repeated here in order to reduce repetition. Correspondingly, the relevant technical details mentioned in this embodiment can also be applied to the first embodiment and the second embodiment.

A fourth embodiment of the present disclosure relates to a voice call method, applied to a second chip. Herein, the second chip is built in a second terminal, and the second terminal may be a second mobile phone or other devices with a dialing function. The implementation details of the voice call method of the present embodiment will be specifically described below, and the following contents are only provided for ease of understanding, and are not necessary for implementing this solution.

Figure 8:
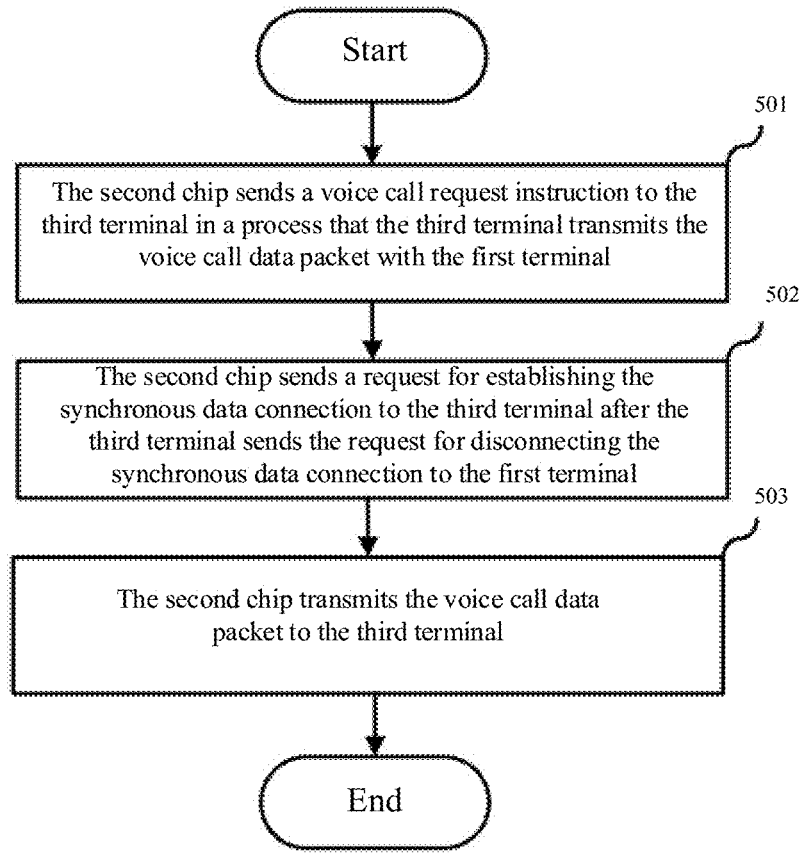
FIG. 8 is a flowchart of a voice call method according to a fourth embodiment of the present disclosure.

Reference is made to FIG. 8 for a flowchart of the voice call method of this embodiment, and the following operations are included.

In operation 501, a voice call request instruction is sent by the second chip to the third terminal in a process that the third terminal transmits the voice call data packet with the first terminal.

Herein, the third terminal is a wireless Bluetooth device, and the wireless Bluetooth device may be a wireless Bluetooth headset, a Bluetooth speaker, a Bluetooth watch, and the like. For ease of description, the third terminal is also represented by the wireless Bluetooth device in the following content.

In one example, after receiving the voice call request instruction sent by the second chip, the third terminal sends a request for disconnect synchronous data connection to the first terminal.

In another example, after receiving the voice call request instruction sent by the second chip and receiving an instruction for indicating permission to access a voice call of the second chip, the third terminal sends the request for disconnecting the synchronous data connection to the first terminal. It may also be understood that the wireless Bluetooth device receives the voice call request instruction sent by the second terminal with the second chip in a process that the wireless Bluetooth device accesses the call of the first terminal, and transmits the voice call data packet with the first terminal. Herein, the voice call request instruction is an instruction sent by the second chip built in the second terminal to the third terminal when the second terminal receives an incoming call.

In operation 502, a request for establishing the synchronous data connection is sent by the second chip to the third terminal after the third terminal sends the request for disconnecting the synchronous data connection to the first terminal.

That is, before the synchronous data connection between the second chip and the wireless Bluetooth device is established, the synchronous data connection established between the first terminal and the wireless Bluetooth device is disconnected.

In one example, before the second chip sends the request for establishing the synchronous data connection to the third terminal, the method further includes: receiving the third instruction sent by the third terminal, where the third instruction is used to trigger the second chip to send a synchronous data connection establishment request to the third terminal. Herein, the third instruction is a third AT instruction. In this embodiment, the third AT instruction is expressed as an AT+BCC instruction. The AT+BCC instruction is used to trigger a party that receives the instruction to send the request for establishing the synchronous data connection. In this example, the party that receives the AT+BCC instruction is the second chip. The second chip sends the request for establishing the synchronous data connection to the third terminal after receiving the AT+BCC instruction.

In one example, the synchronous data connection is: an eSCO connection.

In operation 503, the voice call data packet is transmitted by the second chip to the third terminal.

That is, the second chip starts to transmit the voice call data packet to the third terminal. It may be understood that the wireless Bluetooth device accesses the voice call of the second terminal built with the second chip, and starts to synchronize the voice call data packet with the second terminal.

In one example, after the second chip sends the request for establishing the synchronous data connection to the third terminal, before the second chip transmits the voice call data packet to the third terminal, the method further includes: receiving a fourth instruction sent by the third terminal, where the fourth instruction is used to instruct the second chip to transmit the voice call data packet to the third terminal; and sending a fourth response message to the fourth instruction to the third terminal, where the fourth response message is used to indicate that the voice call data packet is transmitted by the second chip to the third terminal. It may also be understood that the second terminal built with the second chip receives the fourth instruction sent by the wireless Bluetooth device; where the fourth instruction is used to instruct the second terminal with the second chip built in to answer the incoming call and start to transmit the voice call data packet to the wireless Bluetooth device. After that, the second terminal built with the second chip sends the fourth response message to the fourth instruction to the wireless Bluetooth device, where the fourth response message is used to indicate that the second terminal built with the second chip answers the incoming call, that is, the second terminal starts to transmit the voice call data packet to the wireless Bluetooth device.

It is not difficult to find that this embodiment is an embodiment corresponding to the first embodiment, the second embodiment and the third embodiment, the voice call method of this embodiment is applied to the second chip, and the voice call methods of the first embodiment and the second embodiment are applied to the Bluetooth chip, the voice call method of the third embodiment is applied to the first chip. This embodiment can be implemented in cooperation with the first embodiment, the second embodiment and the third embodiment. The relevant technical details and technical effects mentioned in the first embodiment, the second embodiment and the third embodiment are still valid in this embodiment, which will not be repeated here in order to reduce repetition. Correspondingly, the relevant technical details mentioned in this embodiment can also be applied to the first embodiment, the second embodiment and the third embodiment.

The operations of the above various methods are divided only for purpose of describing clearly and may be combined into one operation or some operations may be split into a plurality of operations during implementation. As long as the same logical relationship is included, they are all within the protection scope of the present disclosure. Adding insignificant modifications to an algorithm or process or introducing insignificant designs without changing the core design of the algorithm and process are all within the protection scope of the present disclosure.

Figure 9:
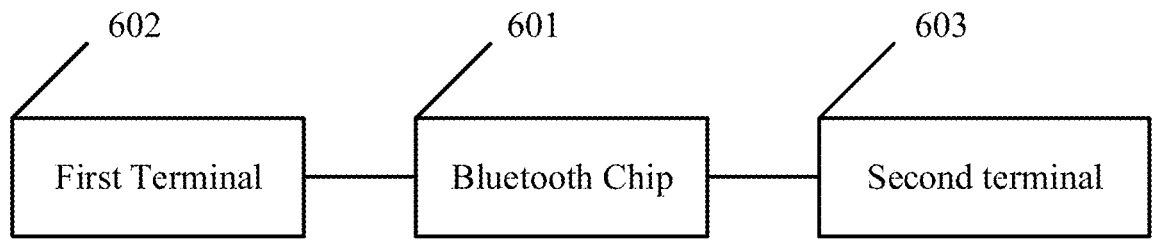
FIG. 9 is a schematic diagram of a voice call system according to a fifth embodiment of the present disclosure.

A fifth embodiment of the present disclosure relates to a voice call system. As shown in FIG. 9, the voice call system includes: a Bluetooth chip 601, a first terminal 602 and a second terminal 603.

The Bluetooth chip 601 is configured to, in response to receiving a voice call request instruction from the second terminal 603 in a process of transmitting a voice call data packet with the first terminal 602, send a request for disconnecting synchronous data connection to the first terminal 602; or configured to, in response to receiving the voice call request instruction from the second terminal 603 and receiving an instruction for indicating permission to access a voice call of the second terminal 603 in the process of transmitting the voice call data packet with the first terminal 602, send a request for disconnecting the synchronous data connection to the first terminal 602.

The first terminal 602 is configured to receive and respond to the request for disconnecting the synchronous data connection sent by the Bluetooth chip.

The second terminal 603 is configured to send the voice call request instruction to the Bluetooth chip 601 after receiving an incoming call, and send a request for establishing the synchronous data connection to the Bluetooth chip 601 after the Bluetooth chip 601 sends the request for disconnecting the synchronous data connection to the first terminal 602.

The Bluetooth chip 601 is further configured to transmit the voice call data packet to the second terminal 603 after receiving the request for establishing the synchronous data connection sent by the second terminal 603.

It is not difficult to find that this embodiment is a system embodiment corresponding to the first to fourth embodiments, and this embodiment can be implemented in cooperation with the first to fourth embodiments. The relevant technical details and technical effects mentioned in the first to fourth embodiments are still valid in this embodiment, which will not be repeated here in order to reduce repetition. Correspondingly, the related technical details mentioned in this embodiment can also be applied to the first to fourth embodiments.

Figure 10:
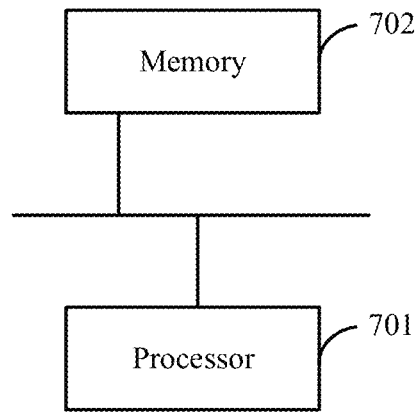
FIG. 10 is a schematic structural diagram of a Bluetooth chip according to a sixth embodiment of the present disclosure.

A sixth embodiment of the present disclosure relates to a Bluetooth chip. As shown in FIG. 10, the Bluetooth chip includes at least one processor 701, and a memory 702 communicatively connected to the at least one processor 701. Herein, the memory 702 is configured to store an instruction executable by the at least one processor 701, and the instruction, when executed by the at least one processor 701, causes the at least one processor 701 to perform the voice call method in the first embodiment or the second embodiment.

The memory 702 and the processor 701 are connected by a bus, the bus includes any number of interconnected buses and bridges, and the bus is configured to connect various circuits of one or more processors 701 and the memory 702 together. The bus also is further configured to connect various other circuits together, such as peripheral devices, voltage regulators, and power management circuits, which are well known in the art and therefore will not be described further herein. A bus interface provides an interface between the bus and a transceiver. The transceiver may be a single element or multiple elements, such as multiple receivers and transmitters, which provides a unit for communicating with various other devices over a transmission medium. Data processed by the processor 701 is transmitted over a wireless medium through an antenna, and further, the antenna also receives and transmits the data to the processor 701.

The processor 701 is configured to manage the bus and general processing, and provide various functions, including timing, peripheral interface, voltage regulation, power management, and other control functions. The memory 702 is configured to store data used by the processor 701 when performing operations.

Figure 11:
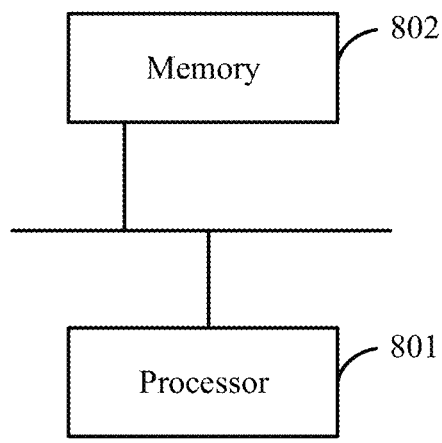
FIG. 11 is a schematic structural diagram of a first chip according to a seventh embodiment of the present disclosure.

A seventh embodiment of the present disclosure relates to a first chip. As shown in FIG. 11, the first chip includes: at least one processor 801, and a memory 802 communicatively connected to the at least one processor 801. Herein, the memory 802 is configured to store an instruction executable by the at least one processor 801, and the instruction, when executed by the at least one processor 801, causes the at least one processor 801 to perform the voice call method in the third embodiment.

The memory 802 and the processor 801 are connected by a bus, the bus includes any number of interconnected buses and bridges, and the bus is configured to connect various circuits of one or more processors 801 and the memory 802 together. The bus is further configured to connect various other circuits together, such as peripheral devices, voltage regulators, and power management circuits, which are well known in the art and therefore will not be described further herein. A bus interface provides an interface between the bus and a transceiver. The transceiver may be a single element or multiple elements, such as multiple receivers and transmitters, which provides a unit for communicating with various other devices over a transmission medium. Data processed by the processor 801 is transmitted over a wireless medium through an antenna, and further, the antenna is further configured to receive and transmit the data to the processor 801.

The processor 801 is configured to manage the bus and general processing, and provide various functions, including timing, peripheral interface, voltage regulation, power management, and other control functions. The memory 802 is configured to store data used by the processor 801 when performing operations.

Figure 12:
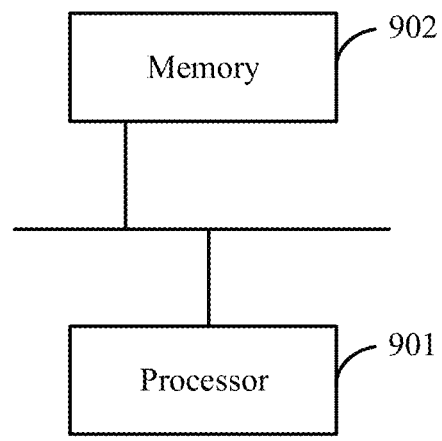
FIG. 12 is a schematic structural diagram of a second chip according to an eighth embodiment of the present disclosure.

An eighth embodiment of the present disclosure relates to a second chip. As shown in FIG. 12, the second chip includes: at least one processor 901; and a memory 902 communicatively connected to the at least one processor 901. Herein, the memory is configured to store an instruction executable by the at least one processor 901, and the instruction, when executed by the at least one processor 901, causes the at least one processor 901 to perform the above voice call method in the fourth embodiment.

Herein, the memory 902 and the processor 901 are connected by a bus, the bus includes any number of interconnected buses and bridges, and the bus is configured to connect various circuits of one or more processors 901 and the memory 902 together. The bus is further configured to connect various other circuits together, such as peripheral devices, voltage regulators, and power management circuits, which are well known in the art and therefore will not be described further herein. A bus interface provides an interface between the bus and a transceiver. The transceiver may be a single element or multiple elements, such as multiple receivers and transmitters, which provides a unit for communicating with various other devices over a transmission medium. Data processed by the processor 901 is transmitted over a wireless medium through an antenna, and the antenna is further configured to receive and transmits the data to the processor 901.

The processor 901 is configured to manage the bus and general processing, and provide various functions, including timing, peripheral interface, voltage regulation, power management, and other control functions. The memory 902 is configured to store data used by the processor 901 when performing operations.

A ninth embodiment of the present disclosure relates to an electronic device. If the electronic device is a third terminal, the electronic device includes the Bluetooth chip described in the sixth embodiment; if the electronic device is a first terminal, the electronic device includes the first chip described in the seventh embodiment; if the electronic device is a second terminal, the electronic device includes the second chip described in the eighth embodiment.

A tenth embodiment of the present disclosure relates to a computer-readable storage medium storing a computer program. The computer program, when executed by a processor, causes the processor to perform the above method embodiments.

That is, those skilled in the art would understand that all or part of the operations in the method of performing the above embodiments can be implemented by instructing a relevant hardware through a program. The program is stored in a storage medium and includes several instructions to make a device (which may be a single-chip microcomputer, a chip, etc.) or a processor perform all or part of the operations of the methods described in the various embodiments of the present disclosure. The storage medium includes: a U disk, a mobile hard disk, a read-only memory, ROM, a random-access memory, RAM, a magnetic disk or optical disk and other medium that can store program codes.

Those of ordinary skill in the art would understand that the above embodiments are specific examples for realizing the present disclosure, and in practical applications, various changes can be made in form and details without departing from the spirit and scope of the present disclosure.

What is claimed is:

1. A voice call method, applied to a Bluetooth chip, comprising:
    in response to receiving a voice call request instruction from a second terminal in a process of transmitting a voice call data packet to a first terminal, sending a request for disconnecting a synchronous data connection to the first terminal;
    transmitting the voice call data packet to the second terminal after receiving a request for establishing a synchronous data connection sent by the second terminal;
    in response to receiving an instruction for indicating an end of a voice call of the second terminal, sending the request for disconnecting the synchronous data connection to the second terminal;
    after sending the request for disconnecting the synchronous data connection to the second terminal, sending a second instruction to the first terminal, wherein the second instruction is used to instruct the first terminal to switch a call state from a holding state to an answering state; and
    receiving a response message to the second instruction from the first terminal, wherein the response message is used to indicate that the call state of the first terminal is currently the answering state.

2. The voice call method according to claim 1, further comprising receiving permission to access a voice call of the second terminal after receiving the voice call request instruction from the second terminal,
    wherein the request for disconnecting the synchronous data connection to the first terminal is sent in response to receiving the permission.

3. The voice call method according to claim 1, wherein before sending the request for disconnecting the synchronous data connection to the first terminal, the method further comprises:
    after receiving the request for establishing the synchronous data connection sent by the second terminal, waiting for a preset time period before responding to the request for establishing the synchronous data connection sent by the second terminal, or sending a message refusing to establish the synchronous data connection to the second terminal.

4. The voice call method according to claim 1, wherein before sending the request for disconnecting the synchronous data connection to the first terminal, the method further comprises:
sending a first instruction to the first terminal, wherein the first instruction is used to instruct the first terminal to switch the call state from the answering state to the holding state; and
receiving a first response message to the first instruction from the first terminal, wherein the first response message is used to indicate that the call state of the first terminal is currently the holding state.

5. The voice call method according to claim 4, wherein after receiving the instruction for indicating the end of the voice call of the second terminal, the method further comprises:
in response to detecting that the call state of the first terminal is the holding state, sending a third instruction to the first terminal, wherein the third instruction is used to trigger the first terminal to send the request for establishing the synchronous data connection to the Bluetooth chip; and
receiving a request for establishing the synchronous data connection sent by the first terminal.

6. The voice call method according to claim 1, wherein before receiving the request for establishing the synchronous data connection sent by the second terminal, the method further comprises:
sending a third instruction to the second terminal, wherein the third instruction is used to trigger the second terminal to send the request for establishing the synchronous data connection to the Bluetooth chip.

7. The voice call method according to claim 1, wherein after receiving the request for establishing the synchronous data connection sent by the second terminal, and before transmitting the voice call data packet to the second terminal, the method further comprises:
sending a fourth instruction to the second terminal, wherein the fourth instruction is used to instruct the second terminal to transmit the voice call data packet to the Bluetooth chip; and
receiving a fourth response message to the fourth instruction from the second terminal, wherein the fourth response message is used to indicate that the voice call data packet is transmitted to the Bluetooth chip by the second terminal.

8. The voice call method according to claim 1, wherein the Bluetooth chip is disposed in a third terminal, and the third terminal is a wireless Bluetooth headset, and the synchronous data connection is an extended synchronous connection-oriented (eSCO) connection.

9. A Bluetooth chip, comprising: a memory and a processor, the memory being communicatively connected to the processor; wherein
the memory is configured to store computer program instructions; and
the processor is configured to execute the computer program instructions stored in the memory to cause the Bluetooth chip performs a voice call method, comprising:
in response to receiving a voice call request instruction from a second terminal in a process of transmitting a voice call data packet to a first terminal, sending a request for disconnecting a synchronous data connection to the first terminal;
transmitting the voice call data packet to the second terminal after receiving a request for establishing a synchronous data connection sent by the second terminal;
in response to receiving an instruction for indicating an end of a voice call of the second terminal, sending the request for disconnecting the synchronous data connection to the second terminal;
after sending the request for disconnecting the synchronous data connection to the second terminal, sending a second instruction to the first terminal, wherein the second instruction is used to instruct the first terminal to switch a call state from a holding state to an answering state; and
receiving a response message to the second instruction from the first terminal, wherein the response message is used to indicate that the call state of the first terminal is currently the answering state.

10. The Bluetooth chip of claim 9, wherein the voice call method further comprises:
receiving permission to access a voice call of the second terminal after receiving the voice call request instruction from the second terminal,
wherein the request for disconnecting the synchronous data connection to the first terminal is sent in response to receiving the permission.

11. The Bluetooth chip of claim 9, wherein the voice call method further comprises:
before sending the request for disconnecting the synchronous data connection to the first terminal and after receiving the request for establishing the synchronous data connection sent by the second terminal, waiting for a preset time period before responding to the request for establishing the synchronous data connection sent by the second terminal, or sending a message refusing to establish the synchronous data connection to the second terminal.

12. The Bluetooth chip of claim 9, wherein the voice call method further comprises:
before sending the request for disconnecting the synchronous data connection to the first terminal, sending a first instruction to the first terminal, wherein the first instruction is used to instruct the first terminal to switch the call state from the answering state to the holding state; and
receiving a first response message to the first instruction from the first terminal, wherein the first response message is used to indicate that the call state of the first terminal is currently the holding state.

13. The Bluetooth chip of claim 9, wherein the voice call method further comprises:
after receiving the instruction for indicating the end of the voice call of the second terminal and in response to detecting that the call state of the first terminal is the holding state, sending a third instruction to the first terminal, wherein the third instruction is used to trigger the first terminal to send the request for establishing the synchronous data connection to the Bluetooth chip; and
receiving a request for establishing the synchronous data connection sent by the first terminal.

14. The Bluetooth chip of claim 9, wherein the voice call method further comprises:
before receiving the request for establishing the synchronous data connection sent by the second terminal, sending a third instruction to the second terminal, wherein the third instruction is used to trigger the second terminal to send the request for establishing the synchronous data connection to the Bluetooth chip.

15. The Bluetooth chip of claim 9, wherein the voice call method further comprises:
    after receiving the request for establishing the synchronous data connection sent by the second terminal, and before transmitting the voice call data packet to the second terminal, sending a fourth instruction to the second terminal, wherein the fourth instruction is used to instruct the second terminal to transmit the voice call data packet to the Bluetooth chip; and
    receiving a fourth response message to the fourth instruction from the second terminal, wherein the fourth response message is used to indicate that the voice call data packet is transmitted to the Bluetooth chip by the second terminal.

16. The Bluetooth chip of claim 9, wherein the Bluetooth chip is disposed in a third terminal, and the third terminal is a wireless Bluetooth headset, and the synchronous data connection is an extended synchronous connection-oriented (eSCO) connection.

17. A voice call method, applied to a Bluetooth chip, comprising:
    in response to receiving a voice call request instruction from a second terminal in a process of transmitting a voice call data packet to a first terminal, sending a request for disconnecting a synchronous data connection to the first terminal;
    after receiving the request for establishing the synchronous data connection sent by the second terminal, and before transmitting the voice call data packet to the second terminal, sending an instruction to the second terminal, wherein the instruction is used to instruct the second terminal to transmit the voice call data packet to the Bluetooth chip;
    receiving a response message to the instruction from the second terminal, wherein the response message is used to indicate that the voice call data packet is transmitted to the Bluetooth chip by the second terminal; and
    transmitting the voice call data packet to the second terminal after receiving a request for establishing a synchronous data connection sent by the second terminal.

18. The voice call method according to claim 17, further comprising receiving permission to access a voice call of the second terminal after receiving the voice call request instruction from the second terminal,
    wherein the request for disconnecting the synchronous data connection to the first terminal is sent in response to receiving the permission.

19. The voice call method according to claim 17, wherein before sending the request for disconnecting the synchronous data connection to the first terminal, the method further comprises:
    after receiving the request for establishing the synchronous data connection sent by the second terminal, waiting for a preset time period before responding to the request for establishing the synchronous data connection sent by the second terminal, or sending a message refusing to establish the synchronous data connection to the second terminal.

20. The voice call method according to claim 17, wherein before sending the request for disconnecting the synchronous data connection to the first terminal, the method further comprises:
    sending a second instruction to the first terminal, wherein the second instruction is used to instruct the first terminal to switch a call state from an answering state to a holding state; and
    receiving a second response message to the second instruction from the first terminal, wherein the second response message is used to indicate that the call state of the first terminal is currently the holding state.

* * * * *